United States Patent
Nakano et al.

(10) Patent No.: US 8,264,917 B2
(45) Date of Patent: Sep. 11, 2012

(54) HEAT GENERATION CONTROL DEVICE FOR HEAT-ASSISTED MAGNETIC RECORDING AND REPRODUCING APPARATUS

(75) Inventors: Ikuo Nakano, Nara (JP); Yoshiteru Murakami, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/225,597

(22) PCT Filed: Mar. 19, 2007

(86) PCT No.: PCT/JP2007/055521
§ 371 (c)(1),
(2), (4) Date: Jul. 31, 2009

(87) PCT Pub. No.: WO2007/111180
PCT Pub. Date: Oct. 4, 2007

(65) Prior Publication Data
US 2009/0296257 A1 Dec. 3, 2009

(30) Foreign Application Priority Data

Mar. 29, 2006 (JP) .................................. 2006-092468

(51) Int. Cl.
*G11B 11/00* (2006.01)
(52) U.S. Cl. ............... 369/13.26; 369/53.26; 369/13.33; 369/13.13
(58) Field of Classification Search .............. 369/53.26, 369/13.26, 13.33, 13.13, 13.32, 13.17, 116, 369/47.5, 47.51, 47.52, 112.09, 112.14, 112.21, 369/112.27; 360/59; 385/129, 31, 88–94; 250/201.3
See application file for complete search history.

(56) References Cited

U.S. PATENT DOCUMENTS

| | | | |
|---|---|---|---|
| 5,656,385 A | 8/1997 | Nakajima et al. | |
| 6,143,436 A | 11/2000 | Nakajima et al. | |
| 6,356,515 B1 * | 3/2002 | Kumita et al. | ............. 369/13.26 |
| 6,603,619 B1 * | 8/2003 | Kojima et al. | .................. 360/59 |
| 6,671,232 B1 * | 12/2003 | Stupp | ......................... 369/13.02 |
| 6,982,843 B2 * | 1/2006 | Coffey et al. | ................... 360/59 |
| 7,020,049 B2 * | 3/2006 | Suzuki et al. | ............. 369/13.26 |
| 7,072,250 B2 * | 7/2006 | Hosokawa | ............. 369/13.14 |
| 7,133,344 B2 * | 11/2006 | Yano et al. | ............. 369/53.26 |
| 7,535,803 B2 * | 5/2009 | Murakami | ................. 369/13.08 |
| 2002/0021641 A1 | 2/2002 | Miyabata et al. | |
| 2002/0064114 A1 | 5/2002 | Sakata et al. | |
| 2003/0223143 A1 | 12/2003 | Fujiwara et al. | |
| 2008/0218891 A1 * | 9/2008 | Gubbins et al. | ................. 360/59 |

(Continued)

FOREIGN PATENT DOCUMENTS

JP          11-161995        6/1999

(Continued)

*Primary Examiner* — Tan X Dinh
(74) *Attorney, Agent, or Firm* — Edwards Wildman Palmer LLP; David G. Conlin; David A. Tucker

(57) ABSTRACT

According to the present invention, heat generation amount control information for controlling a heat generation amount of a heat generating section (20) is arranged to correspond to each of temperatures so that a predetermined heat generation amount is obtained at each of the temperatures. The present invention includes a first computing section (41) that controls the heat generation amount of the heat generating section (20) according to the heat generation amount control information that is arranged in advance to correspond to temperature information that is obtained from a temperature sensor (13). This easily makes it possible to appropriately carry out at least either recording or reproduction with respect to a magnetic recording medium.

22 Claims, 13 Drawing Sheets

U.S. PATENT DOCUMENTS

2009/0040645 A1* 2/2009 Shimazawa et al. ............ 360/59
2009/0303629 A1* 12/2009 Nakano et al. .................. 360/31

FOREIGN PATENT DOCUMENTS

| JP | 2002-298301 | 10/2002 |
| JP | 2003-067962 | 3/2003 |
| JP | 2003-141703 | 5/2003 |
| JP | 2004-005852 A | 1/2004 |
| JP | 2004-079182 | 3/2004 |
| JP | 2004-335030 | 11/2004 |

* cited by examiner

HEAT GENERATION CONTROL DEVICE FOR HEAT-ASSISTED MAGNETIC RECORDING AND REPRODUCING APPARATUS

TECHNICAL FIELD

The present invention relates to a heat generation amount control device that is used at least either for heating a recording area for recording magnetic information by use of a recording head or for heating a reproduction area for reproduction of information by use of a reproducing head that has a magneto resistive effect, a program and a recording medium for the heat generation amount control device, a magnetic disk device, and a heat generation amount control method.

BACKGROUND ART

Recently, a technique for realizing a high-density recording has been developed as a result of fusion of optical technology and magnetic recording/reproducing technology. For example, Patent Document 1 discloses a magnetic recording medium made of a ferromagnetic substance whose compensation temperature is substantially a room temperature, and a heat-assisted magnetic recording/reproducing method in which recording/reproduction of information is carried out, by using a laser beam, with respect to the magnetic recording medium made of the ferromagnetic substance.

In a magnetic recording/reproducing device that utilizes a heat-assisted recording/reproducing method as disclosed in Patent Document 1 (Japanese Unexamined Patent Publication No. 176034/1992 (Tokukaihei 4-176034) (published on Jun. 23, 1992)), a temperature of the magnetic recording medium is increased by a laser beam at the time of recording so as to decrease a coercive force of a recording area in the magnetic recording medium. While the coercive force of the recording area in the magnetic recording medium is in a decreased state as described above, information is magnetically recorded on the magnetic recording medium by applying, with the use of a recording head, an external electric field to the magnetic recording medium.

Meanwhile, at the time of reproduction, temperature dependency of remanent magnetization is utilized. A temperature of a reproduction area in the magnetic recording medium is increased by the laser beam to a temperature at which the remanent magnetization becomes sufficiently large. Then, information recorded on the magnetic recording medium is reproduced by detecting, with the use of a reproducing head, a magnetic flux from the remanent magnetization that has become sufficiently large by the increased temperature. Here, in a reproduction area whose temperature is not increased by the laser beam, the remanent magnetization is close to 0. Therefore, crosstalk due to a signal that leaks from an adjacent track can be suppressed to a sufficiently small level. This makes it possible to realize the reproduction of the information that is recorded in a high density.

In the magnetic recording/reproducing device that utilizes the heat-assisted magnetic recording/reproducing method, the temperature of the recording area or the reproduction area of the magnetic recording medium affects stability of recording/reproduction and a signal quality. Therefore, it is important to control heat generation means for heating the magnetic recording medium.

For example, Patent Document 2 (Japanese Unexamined Patent Publication No. 298301/2002 (Tokukai 2002-298301) (published on Oct. 11, 2002)) discloses a control method of heat generation means for heating a magnetic recording medium. The control method includes steps of: writing in predetermined specific data; reproducing the written-in data; comparing a read result of the reproduced data with the specific data to be written in; and recording, in a memory, a temperature inside a device and control information of heat generation means which are of a case where recording is successful, as a reference at the time of controlling the heat generation means.

However, the following problem occurs in a case, as in the conventional recording/reproducing method as disclosed in Patent Document 1 and the conventional heat-assisted magnetic recording/reproducing method as disclosed in Patent Document 2, that employs a compound semiconductor light source such as a semiconductor laser or a light emitting diode. This problem is explained by taking a semiconductor laser as an example of the compound semiconductor light source.

The semiconductor laser has a driving current that causes the semiconductor laser to perform laser oscillation, that is, a threshold current. However, the threshold current is known to vary depending on a temperature. Accordingly, even if, as in the heat-assisted magnetic recording/reproducing method as disclosed in Patent Document 2, the temperature inside the heat-assisted magnetic recording/reproducing device and the control information of the heat generation means are recorded, for every trial recording, in a memory inside the heat-assisted magnetic recording/reproducing device, the temperature momentarily varies due to driving of the device. Therefore, unless a vast number of trial recordings are made, the device cannot deal with the variation in the threshold current. The following explains further in detail by taking one example.

First, the following assumptions are made. That is, an operation temperature range is in a range of, for example, −20° C. to +85° C. Moreover, a wavelength of a semiconductor laser used as a light source of the device is 658 nm. Further, a threshold current in a case of a temperature of 25° C. is 25 mA. A temperature dependency Δt of the threshold current is 0.3 mA/° C. A slope efficiency (a relationship between a driving current and a light output after laser oscillation) is 0.55 mW/mA.

On such assumptions, in a case where the temperature inside the device increases from 25° C. to 30° C. by 5° C., the threshold current of the semiconductor laser increases by 1.5 mA. Accordingly, in a case where the semiconductor laser is driven by constant current driving, the light output decreases by 0.83 mW. Meanwhile, the light output necessary for recording a signal on the magnetic recording medium decreases only by 0.1 mW. This is based on the following calculation.

For example, the followings are assumed: the temperature inside the device is 25° C.; and a temperature of a magnetic recording medium is 200° C. at the time of recording a signal. If the temperature of the magnetic recording medium at 25° C. that is the same as the temperature inside the device can be increased to 200° C. by heating with the use of the light output of 3 mW from the semiconductor laser, an amount of increase in the temperature of the magnetic recording medium decreases from 175° C. to 170° C. (−3% with respect to 175° C.) in a case where the temperature inside the device is 30° C. Therefore, in simple calculation, the light output of the semiconductor laser necessary for the increase in the temperature of the magnetic recording medium becomes 2.9 mW that is −3% with respect to 3 mW. From thus obtained result, the light output necessary for recording a signal on the magnetic recording medium decreases only by 0.1 mW.

In other words, in a case where the semiconductor laser is driven at a constant driving current regardless of temperature variation inside the device, the light output of the semiconductor laser decreases at a rate that is larger than a rate at which the light output necessary for recording a signal on the magnetic recording medium decreases. Accordingly, shortage occurs in the light output from the laser, for recording a signal on the magnetic recording medium. That is, due to an insufficient temperature increase of the magnetic recording medium, desired recording or a reproduction quality cannot be maintained.

As explained above, a light output of a compound semiconductor light source such as a semiconductor laser and a light emitting diode has temperature dependency. Therefore, if control information of a heat generating device is sought from trial records every time a user tries to record a signal on the magnetic recording medium, it takes a lot of time for trial recordings. Moreover, the light output at the time of starting the trial recording may largely differ from an optimum condition for carrying out recording on the magnetic recording medium. In a case where the light output at the time of starting the trial recording is excessively larger than that in the optimum condition for carrying out recording on the magnetic recording medium, user data may be wrongly erased from the magnetic recording medium.

A possible method to deal with the problem caused by the temperature dependency of the light output from the compound semiconductor light source is a method to deal with variation in the light output according to temperature variation by receiving, with the use of a light receiving element, the light output from the compound semiconductor light source. However, recently, a size of a recording/reproducing head has been further reduced. Therefore, in a case of a recording/reproducing head that is integrated with the compound semiconductor light source, it may be difficult to mount a light receiving element on the recording/reproducing head.

DISCLOSURE OF INVENTION

The present invention is attained in view of the conventional problem. An object of the present invention is to provide a heat generation amount control device that easily makes it possible to appropriately carry out at least either recording/reproduction with respect to a magnetic recording medium, a program and a recording medium for the heat generation amount control device, a magnetic disk device, and a heat generation amount control method.

In order to solve the problem above, a heat generation amount control device of the present invention that controls a heat generation amount of heat generation means for a magnetic recording medium, in at least either (i) a case where a recording area of the magnetic recording medium is heated by the heat generation means so that information is recorded on the magnetic recording medium by use of a recording head or (ii) a case where a reproduction area of the magnetic recording medium is heated by the heat generation means so that information is reproduced by use of a reproducing head, the heat generation amount control device includes: first computing means controlling the heat generation amount of the heat generation means according to heat generation amount control information that is arranged in advance to correspond to information on a temperature that is obtained from temperature detection means, the heat generation amount control information for controlling the heat generation amount of the heat generation means, the heat generation amount control information being arranged to correspond to each temperature so that the heat generation amount becomes a predetermined heat generation amount at the each temperature.

According to the invention, the first computing means controls the heat generation amount of the heat generation means according to the heat generation amount control information that is arranged in advance to correspond to information on a temperature that is obtained from the temperature detection means. Therefore, if the predetermined heat generation amount is a heat generation amount with which the magnetic recording medium is appropriately heated, it becomes possible to set the heat generation amount control information in accordance with the temperature variation even in a case where the heat generation amount control information varies which heat generation amount control information is for controlling the heat generation means heating the recording area or the reproduction area of the heat recording medium in accordance with the temperature variation. Because an instruction on the heat generation amount that is obtained by the heat generation means is given according to the heat generation amount control information in accordance with the temperature variation, it becomes possible to prevent wrong erasing of the information that has been recorded. This wrong erasing occurs due to excessive temperature increase in the recording area or the reproduction area of the magnetic recording medium. In other words, it becomes possible to appropriately carry out at least either recording or reproduction with respect to the magnetic recording medium. Furthermore, because recording or reproduction can be appropriately carried out with respect to the magnetic recording medium as described above, it becomes unnecessary to take time for examining, by performing test writing or test reading, heat generation amount control information appropriate for carrying out recording or reproduction with respect to the magnetic recording medium.

Further, even in a case where the test writing or the test reading is performed, the test writing or the test reading can be performed based on the appropriate heat generation amount control information and the heat generation amount control information that is determined by the first computing means. Accordingly, the number of trying the test writing or the test reading can be reduced. As a result, it becomes possible to shorten a time for determining the heat generation amount control information of the heat generation means.

This easily makes it possible to appropriately carry out at least either recording or reproduction with respect to the magnetic recording medium, in accordance with the temperature variation.

In order to solve the problem mentioned above, a heat generation amount control method of the present invention controlling a heat generation amount of heat generation means for a magnetic recording medium in at least either one of (i) the step of recording information on the magnetic recording medium by use of a recording head after a recording area of the magnetic recording medium is heated by use of the heat generation means and (ii) the step of reproducing information by use of a reproducing head after a reproduction area of the magnetic recording medium is heated by use of the heat generation means, the heat generation amount control method includes steps of: detecting information on a temperature by temperature detection means; and performing first computing, by first computing means, for controlling the heat generation amount of the heat generation means according to the heat generation amount control information that is arranged in advance to correspond to the information on the temperature obtained from the temperature detection means.

The present invention easily makes it possible to appropriately carry out at least either recording or reproduction with respect to the magnetic recording medium, in accordance with temperature variation.

BEST MODE FOR CARRYING OUT THE INVENTION

[Embodiment 1]

Figure 1:
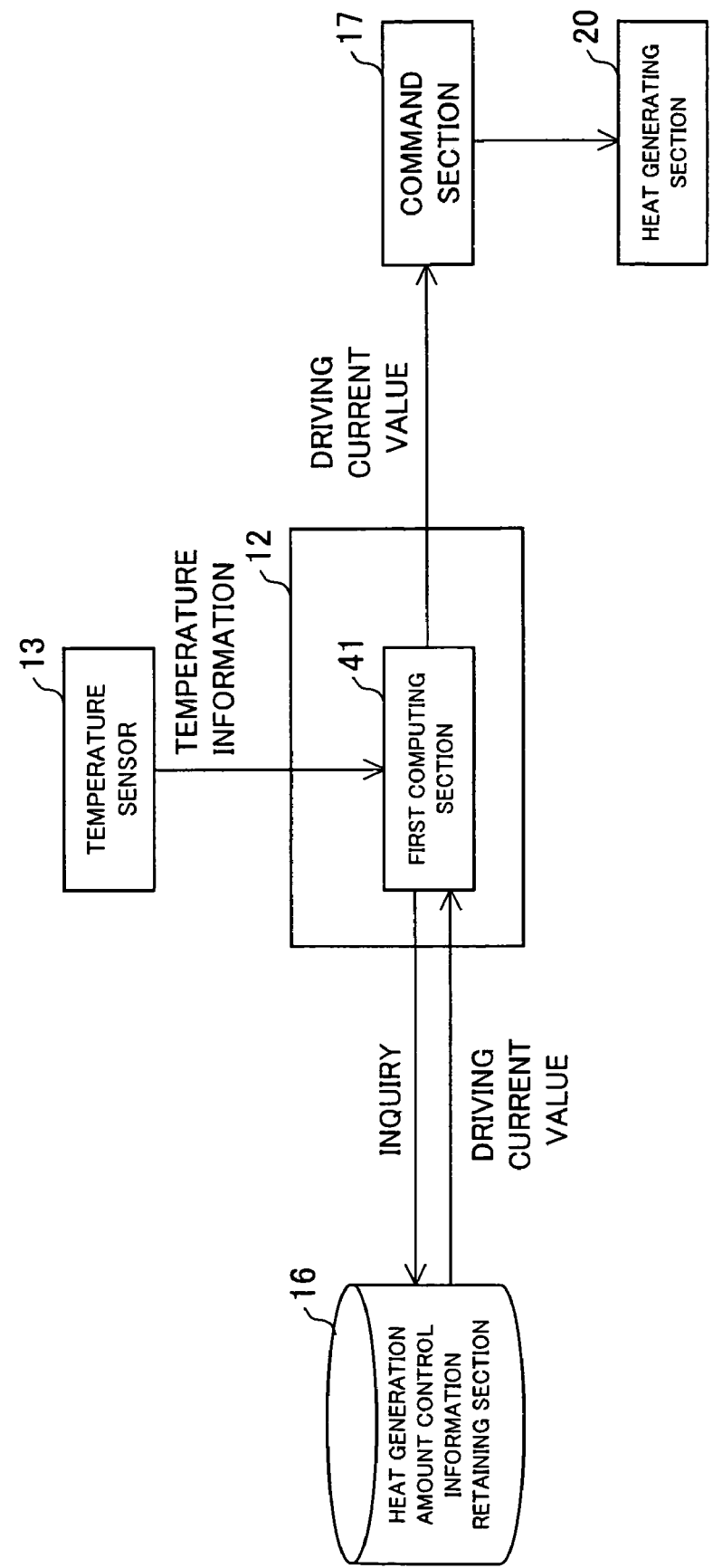
FIG. 1 is a functional block diagram of a heat generation amount control device of the present invention.
Figure 2:
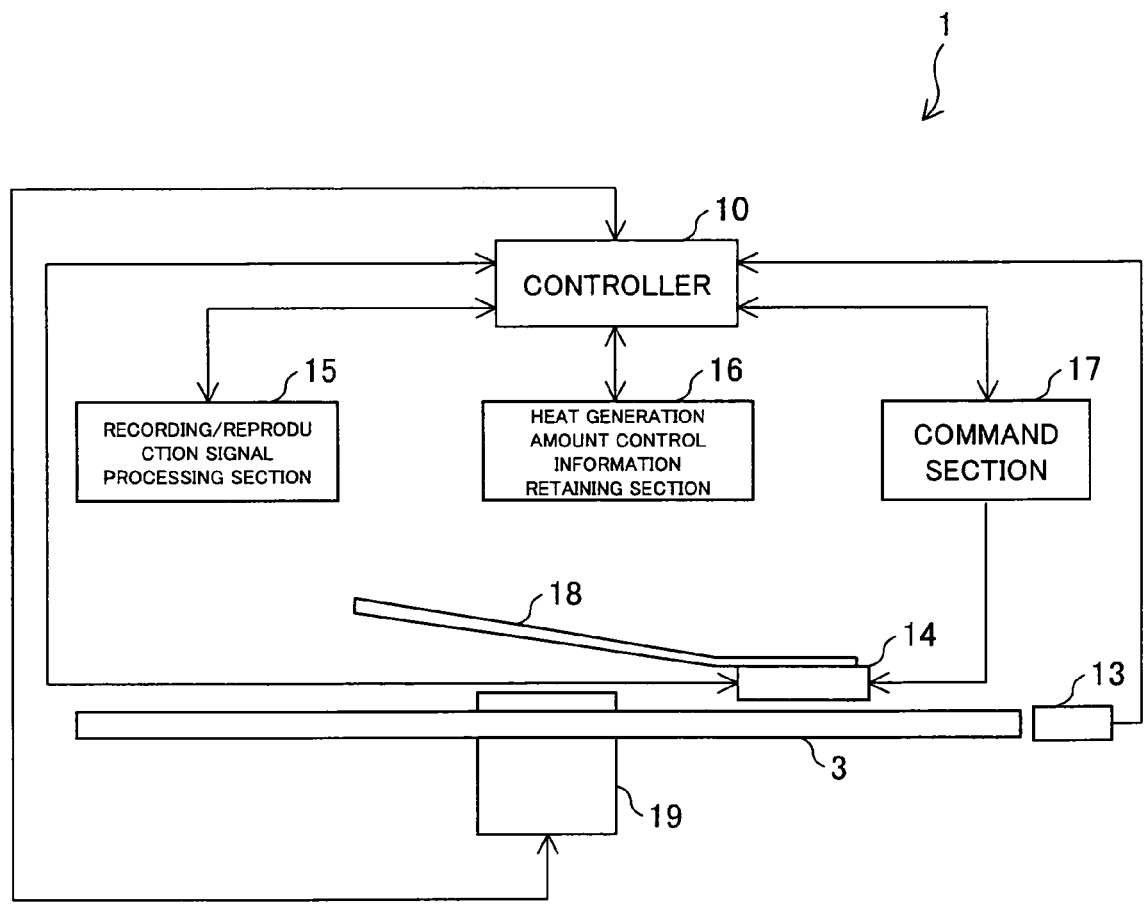
FIG. 2 is a diagram schematically illustrating an arrangement of a magnetic recording/reproducing device of the present invention.

The following explains one embodiment of the present invention, with reference to FIGS. 1 through 8. First, an arrangement of a magnetic recording/reproducing device (magnetic disk device) 1 is schematically explained with reference to FIG. 2. FIG. 2 is a block diagram illustrating an arrangement of the magnetic recording/reproducing device 1 according to the present embodiment.

As illustrated in FIG. 2, the magnetic recording/reproducing device 1 of the present embodiment includes a controller 10, a temperature sensor (temperature detection means) 13, a recording/reproducing head 14, a recording/reproduction signal processing section 15, a heat generation amount control information retaining section (heat generation amount control information retention means) 16, a command section (command means) 17, a suspension 18, and a spindle motor (spin means) 19. Moreover, a magnetic recording medium 3 is placed so as to be fixed to the spindle motor 19. Note that the magnetic recording medium 3 is placed detachably to the spindle motor 19.

Figure 3:
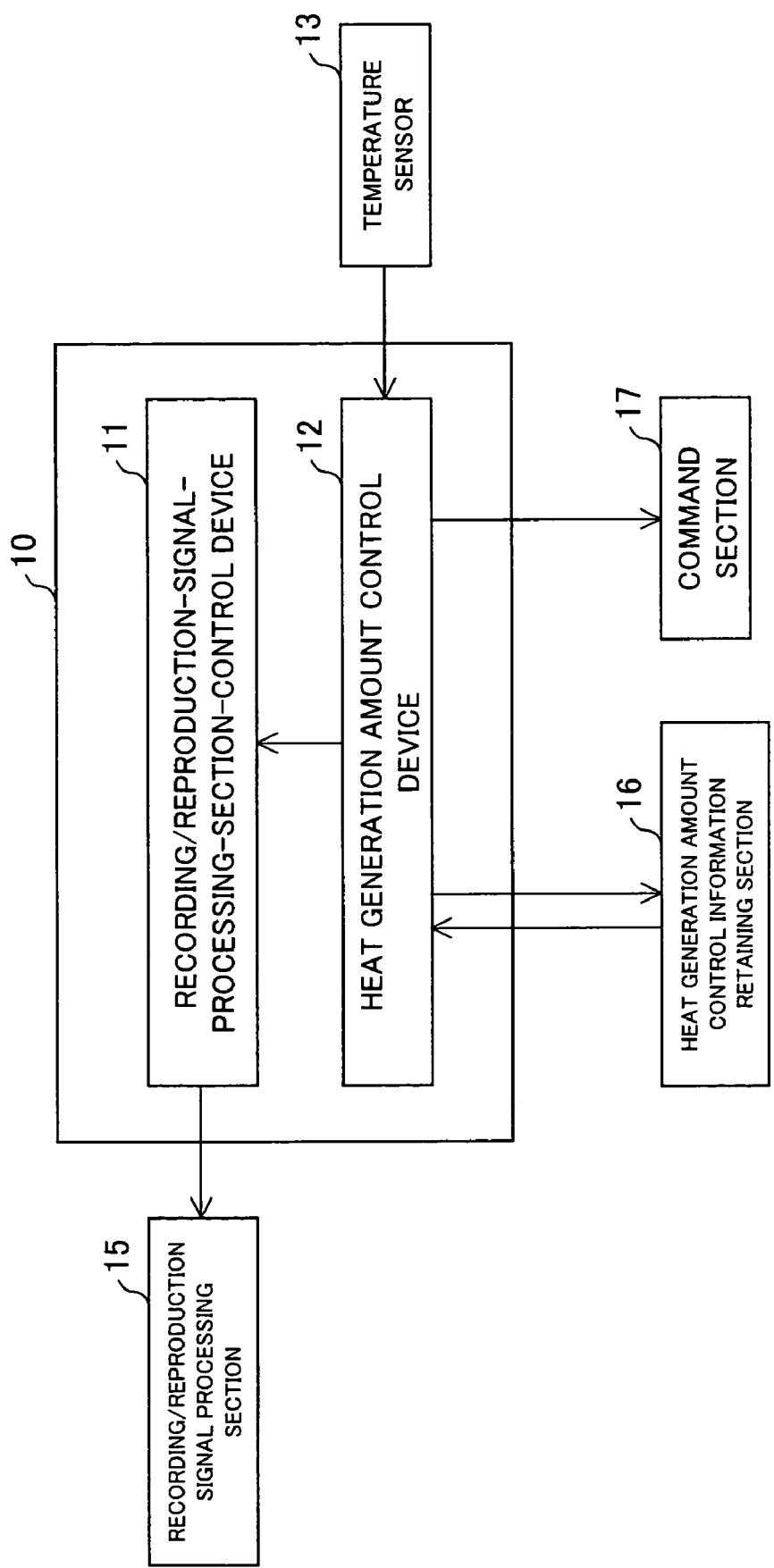
FIG. 3 is a diagram schematically illustrating an arrangement of a controller of the magnetic recording/reproducing device.

As illustrated in FIG. 3, the controller 10 includes a recording/reproduction-signal-processing-section-control device 11 and a heat generation amount control device 12. The recording/reproduction-signal-processing-section-control device 11 controls the recording/reproduction signal processing section 15.

The heat generation amount control device 12 makes an inquiry to the heat generation amount control information retaining section 16, based on temperature information (information on a temperature, or information on temperatures) that is obtained from the temperature sensor 13 so as to determine heat generation amount control information corresponding to the temperature information that is obtained from the temperature sensor 13. Further, the heat generation amount control device 12 gives, via the command section 17 explained later, an instruction on an amount of a light output from a semiconductor laser 23 in a heat generating section 20 that is explained later, according to the determined heat generation amount control information. Note that the heat generation amount control information is a driving current value that is to be inputted into the semiconductor laser 23 so as to determine the size of light output. In other words, the heat generation amount control information is information that determines a heating amount of a recording area or a reproduction area of the magnetic recording medium 3.

The temperature sensor 13 is capable of measuring a temperature inside the magnetic recording/reproducing device 1. An output (temperature information) from the temperature sensor 13 is inputted into the heat generation amount control device 12 explained later in the controller 10. Therefore, the temperature sensor 13 can measure a temperature inside the magnetic recording/reproducing device 1.

Figure 4:
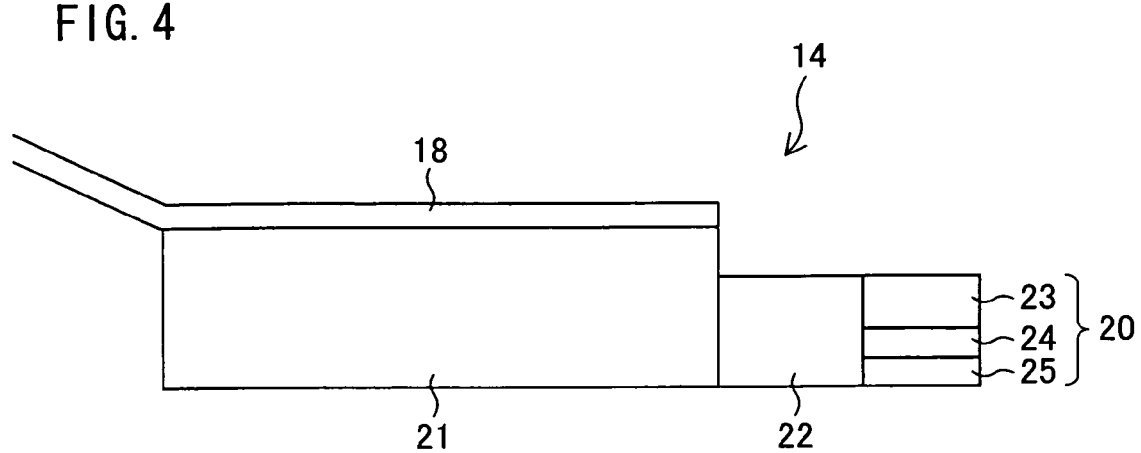
FIG. 4 is a diagram schematically illustrating an arrangement of a recording/reproducing head of the magnetic recording/reproducing device.

As illustrated in FIG. 4, the recording/reproducing head 14 is a member in which a slider 21, a reproducing head 22, the semiconductor laser (light source) 23, a gradient index distribution lens 24, and a recording head 25 are integrated. The semiconductor laser 23, the gradient index distribution lens 24, and the recording head 25 constitutes the heat generating section (heat generation means) 20.

The slider 21 makes the recording/reproducing head 14 floating above the magnetic recording medium 3 so that a space is provided between the recording/reproducing head 14 and the magnetic recording medium 3. The reproducing head 22 reads information that is recorded on the magnetic recording medium 3 and includes a TMR element. The semiconductor laser 23 is a light source and emits light. The gradient index lens 24 is also called a GRIN lens and focuses light. The recording head 25 records information on the magnetic recording medium 3, and includes a metal thin line section 26 that is a thin line structure including a bending section in the shape of the character U, as illustrated in FIG. 4.

Figure 5:
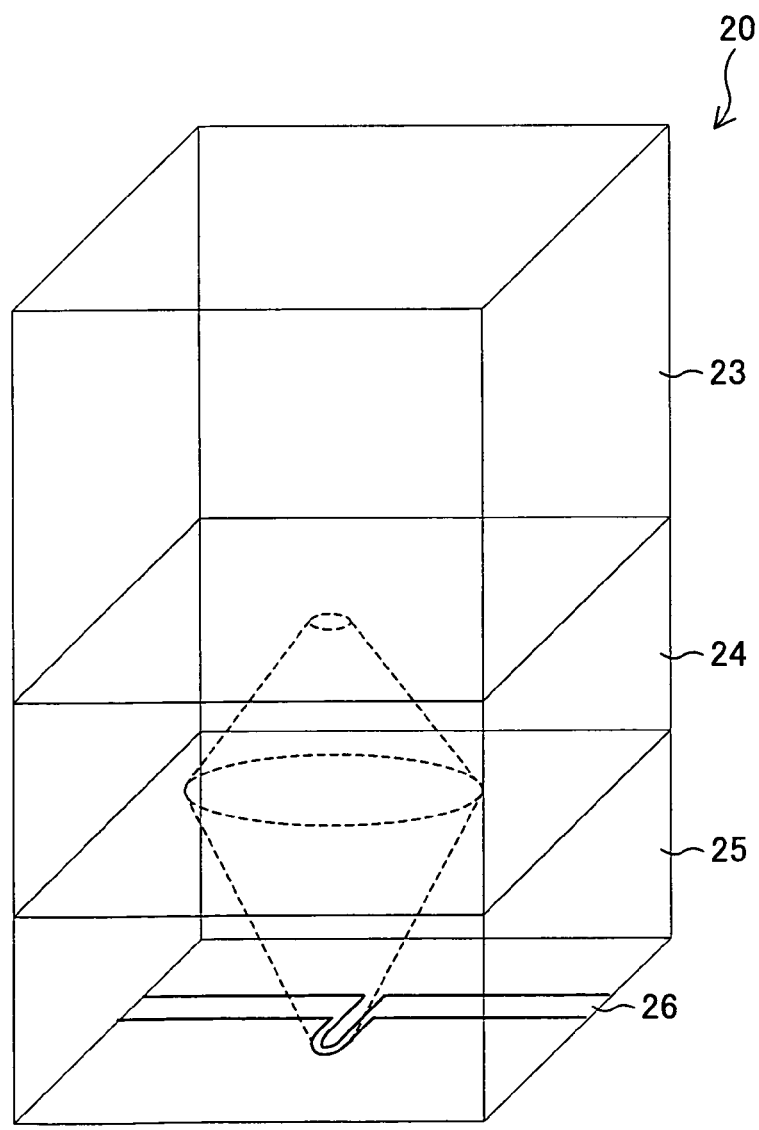
FIG. 5 is a diagram schematically illustrating an arrangement of a recording head of the magnetic recording/reproducing device.

FIG. 5 is a diagram illustrating a structure of the heat generating section 20. The heat generating section 20 is arranged such that the light emitted from the semiconductor laser 23 that is a light source is focused on the recording head 25 by the gradient index lens 24. Moreover, in response to an input of a driving current not less than a threshold current into the semiconductor laser 23, the semiconductor laser 23 performs laser oscillation and emits light towards the recording head 25. The threshold current is a driving current that causes the semiconductor laser 23 to perform laser oscillation.

As described above, the recording head 25 includes the metal thin line section 26. By inputting, into the metal thin line section 26, a high-frequency signal current corresponding to information to be recorded, it becomes possible to produce, around the metal thin line section 26, a magnetic field parallel to a surface-normal direction of the magnetic recording medium 3. Moreover, when the light emitted from the semiconductor laser 23 is irradiated on the metal thin line section 26, light called evanescent light is produced on a surface of the metal thin line section 26 on a side provided with the magnetic recording medium 3. The evanescent light is light that occurs on a surface of a substance, when light is irradiated on the substance. Such evanescent light is not propagated but localized in the very limited vicinity of the surface of the substance. The magnetic recording medium 3 can be heated by the evanescent light that is produced on the surface of the metal thin line section 26 on the side provided with the magnetic recording medium 3. As described above, the recording head 25 is arranged to record information on the magnetic recording medium 3, by utilizing activity of a magnetic field that is produced by the recording head 25 and activity of the evanescent light.

As described above, the reproducing head 22 includes the TMR element, and has a magneto resistive effect. In response to an input of a sensor current into the TMR element, the reproducing head 22 reproduces a signal recorded on the magnetic recording medium 3.

The recording/reproduction signal processing section 15 converts, into a high-frequency signal current, information to be recorded at the time of recording. The information to be recorded is sent from the recording/reproduction-signal-processing-section-control device 11. The recording/reproduction signal processing section 15 sends the high-frequency signal current to the recording head 25. Meanwhile, at the time of reproduction, the recording/reproduction signal processing section 15 demodulates, into a digital signal, the high-frequency signal current reproduced by the reproducing head 22.

The heat generation amount control information retaining section 16 is made of a flash memory. When the magnetic recording/reproducing device 1 is produced, information on a plurality of temperatures and heat generation amount control information corresponding to the plurality of temperatures is stored (recorded) in the heat generation amount control information retaining section 16 so as to correspond to each other. The heat generation means here indicates the heat generating section 20. Moreover, the heat generation amount control information indicates information on a driving current value of the semiconductor laser 23 which information is for controlling an intensity of the evanescent light necessary for heating the magnetic recording medium 3 to a predetermined temperature.

In other words, the heat generation amount control information retaining section 16 stores in advance, in the production of the magnetic recording/reproducing device 1, a driving current value of the semiconductor laser 23 at each temperature in an operation temperature range of the magnetic recording/reproducing device 1 and the each temperature corresponding to the driving current value. The following explains a method of determining the driving current value of the semiconductor laser 23 in the production of the magnetic recording/reproducing device 1.

The semiconductor laser 23 has a different threshold current due to variation in production of the semiconductor laser 23. Accordingly, it is necessary to obtain heat generation amount control information so that the number of pieces of the heat generation amount control information corresponds to the number of the semiconductor lasers 23 that are provided to the plurality of recording heads 25 in the magnetic recording/reproducing device 1, and to store the heat generation amount control information in the heat generation amount control information retaining section 16. The heat generation amount control information can be obtained by determining the driving current value of the semiconductor laser 23 according to the steps below, after the magnetic recording/reproducing device 1 is set in a temperature-controlled bath in which a temperature condition can be changed and the temperature of the magnetic recording/reproducing device 1 is changed within the operation temperature range of the magnetic recording/reproducing device 1.

First, a predetermined driving current is inputted into the semiconductor laser 23 so that light is irradiated on the recording head 25. Then, a predetermined high-frequency signal current is inputted into the metal thin line section 26 of the recording head 25. The inputted predetermined high-frequency signal current is of an amount that allows a reference signal to be recorded. As a result, the reference signal is recorded on the magnetic recording medium 3. Then, the signal is reproduced by the reproducing head 22 so that a signal evaluation index is measured. An example of the predetermined driving current is a driving current that is found, in measurement in a preliminary experiment, to be (i) larger than the threshold current of the semiconductor laser 23 which threshold current corresponds to the temperature of the temperature-controlled bath and (ii) capable of performing appropriate recording at the above temperature of the temperature-controlled bath. This driving current is smaller than a driving current of the semiconductor laser 23. An example of the reference signal to be recorded includes a single frequency signal or a random signal that is a signal whose frequency is randomly varied. An example of the signal evaluation index is a result of comparison between a reference signal waveform and a reproduction waveform, a jitter value, an error rate, or a signal amplitude value. A mean squared error value of discrete sampling data (an average value of a squared difference between respective output values of sampled data points of the waveforms) is used as the signal evaluation index in a case where the result of comparison between the reference signal waveform and the reproduction waveform is used as the signal evaluation index.

Subsequently, in a case where a value of the signal evaluation index is less than the reference value, the driving current value that is inputted into the semiconductor laser 23 is varied, so that the driving current value is increased and recording is performed again. The reference value of the signal evaluation index here is a value that varies depending on a type of an evaluation value used as the signal evaluation index. In the case where a mean squared error value of a result of comparison between the reference signal waveform and the reproduction waveform, a jitter value, or an error rate is used as the signal evaluation index, the value of the signal evaluation index should be not more than the predetermined reference value. Meanwhile, in the case where a signal amplitude value is used as the signal evaluation index, the value of the signal evaluation index should be not less than the predetermined reference value. The reference value is a value that is set as appropriate as a value capable of ensuring that, if a signal can attain a signal evaluation value not less than a certain "reference value", a burst error does not occur, that is, the signal is not read as wrong data after signal processing such as an error correction.

Figure 6A:
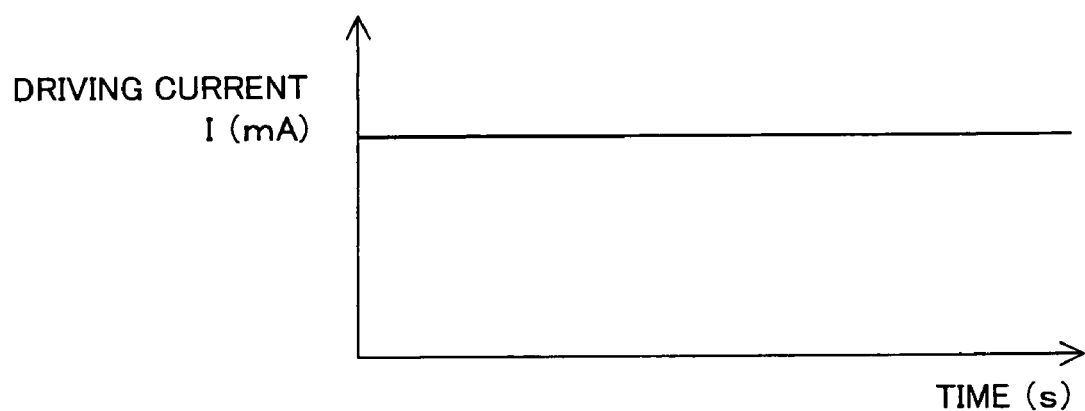
FIG. 6(a) is a chart illustrating a waveform of a driving current to be inputted into a semiconductor laser of the recording/reproducing head.
Figure 6B:
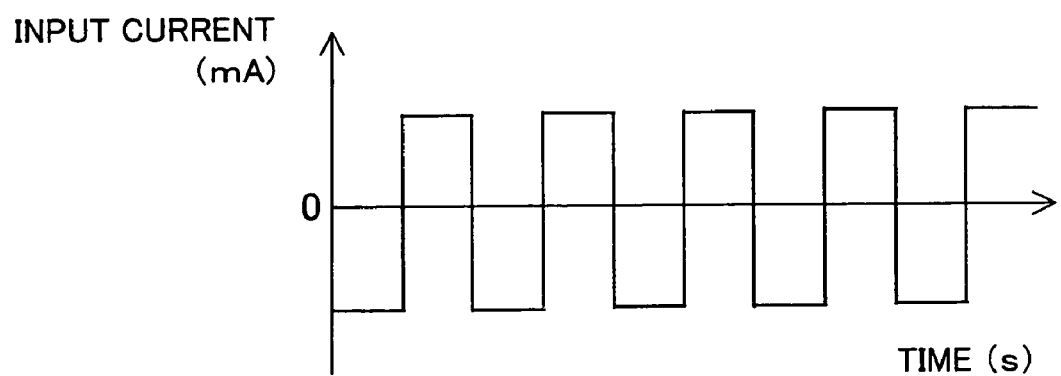
FIG. 6(b) is a chart illustrating a waveform of a high-frequency signal current to be inputted into a metal thin line section of the recording head.

At a stage where the value of the signal evaluation index reaches the reference value, the temperature information of the temperature sensor 13 and the driving current value are recorded in the heat generation amount control information retaining section 16. The driving current that is inputted into the semiconductor laser 23 is a driving current of a constant value as illustrated in FIG. 6(a). A current waveform of the high-frequency signal current to be inputted into the metal thin line section 26 is a waveform as illustrated in FIG. 6(b). The current waveform as illustrated in FIG. 6(b) is a current waveform of a case where a record mark of a single frequency is successively recorded. In a case where a signal of a different record mark length (different frequency) is successively recorded, the current waveform corresponds to the record mark length. Though FIG. 6(b) illustrates the waveform of the high-frequency signal current as a rectangular wave, the waveform of the high-frequency signal current may be of a sine wave or other optionally set current waveform. The driving current value to be inputted into the semiconductor laser 23 may be varied according to a record mark length. In such a case, the heat generation amount control information retaining section 16 should store information on the temperature and the driving current value for each record mark length (frequency).

The command section (command means) 17 inputs a driving current value as the heat generation amount control information into the semiconductor laser 23 that is a light source.

The suspension 18 is made of, for example, stainless, and attached to the magnetic recording/reproducing device 1. Moreover, the recording/reproducing head 14 is attached to a part of the suspension 18 which part is different from a part where the suspension 18 is attached to the magnetic recording/reproducing device 1. The suspension 18 makes the recording/reproducing head 14 float so that a space is provided between the recording/reproducing head 14 and a surface of the magnetic recording medium 3 that is placed to the spindle motor 19.

The spindle motor 19 spins the magnetic recording medium 3 at a constant angular speed. The number of spins of the spindle motor 19 is controlled by a signal from the controller 10.

The magnetic recording medium 3 is a heat-assisted recording medium that is produced by forming, on a glass substrate, a film of a magnetic material whose coercive force is decreased by heating. An example of the magnetic material used for forming the magnetic film on the magnetic recording medium 3 is TbFeCo. On a surface of the magnetic film on a side provided with the recording/reproducing head 14, an A1N film or a CN film that has a thickness of some nm are formed for protection of the magnetic film. A lubricity agent is applied on the CN film. When information is recorded on the magnetic recording medium 3, the magnetic recording medium 3 is heated by the heating section 20 so that the information is recorded by the recording head 25.

The magnetic recording/reproducing device 1 of the present invention includes a plurality of magnetic recording mediums 3. Moreover, on each of both sides of each magnetic recording medium 3, a magnetic film is formed. Further, a plurality of recording/reproducing heads 14 are provided so as to face respective film surfaces of the magnetic films. Accordingly, the recording/reproduction signal processing section 15, the heat generation amount control information retaining section 16, and the command section 17 deal with each of the plurality of recording/reproducing heads 14.

Next, the following explains an arrangement of the heat generation amount control device 12 of the present embodiment, with reference to FIG. 1. FIG. 1 is a functional block diagram of the heat generation amount control device 12 of the present embodiment.

As illustrated in FIG. 1, the heat generation amount control device 12 includes a first computing section (first computing means) 41.

The first computing section 41 performs calculation according to predetermined steps, based on temperature information that is obtained from the temperature sensor 13. Specifically, in the calculation, the first computing section 41 makes an inquiry to the generation amount control information retaining section 16, according to the temperature information that is obtained from the temperature sensor 13, so that heat generation amount control information corresponding to the temperature information is determined. Then, the driving current value obtained by the first computing section 41 is sent to the command section 17.

Next, the following explains a method of recording information corresponding to a temperature in the magnetic recording/reproducing device 1. When the information is recorded on the magnetic recording medium 3, the heat generation amount control device 12 obtains the temperature information on a temperature inside the magnetic recording/reproducing device 1 from the temperature sensor 13. Then, the heat generation amount control device 12 makes an inquiry, for the temperature information, to the heat generation amount control information retaining section 16, and obtains heat generation amount control information corresponding to the temperature information. Moreover, the heat generation amount control device 12 sends the heat generation amount control information, that is, the driving current value to be inputted into the semiconductor laser 23, to the command section 17. At this time, the recording/reproduction-signal-processing-section-control device 11 sends information to be recorded on the magnetic recording medium 3 to the recording/reproduction signal processing section 15. Then, the recording/reproduction signal processing section 15 converts, into a high-frequency signal current to be inputted into the recording head 25, the information to be recorded and sends thus converted high-frequency signal current to the recording head 25.

The command section 17 inputs the driving current value that is determined by the heat generation amount control device 12, into the semiconductor laser 23 that the recording/reproducing head 14 includes. The semiconductor laser 23 irradiates light of the light output corresponding to the driving current value on the recording head 25, and produces evanescent light. As a result, the magnetic recording medium 3 is heated by the evanescent light. Moreover, the high-frequency signal current that is inputted into the recording head 25 from the recording/reproduction signal processing section 15 produces a magnetic field on the magnetic recording medium 3, and causes the information to be recorded on the magnetic recording medium 3.

The following explains a method of reproducing information corresponding to a temperature in the magnetic recording/reproducing device 1.

When information is reproduced from the magnetic recording medium 3, the heat generation amount control device 12 obtains the temperature information on a temperature inside the magnetic recording/reproducing device 1 from the temperature sensor 13. The heat generation amount control device 12 makes an inquiry, for the temperature information, to the heat generation amount control information retaining section 16, and obtains the heat generation amount control information corresponding to the temperature information. Then, the heat generation amount control device 12 sends, to the command section 17, the heat generation amount control information that is, the driving current value to be inputted into the semiconductor laser 23.

The command section 17 inputs the driving current value that is determined by the heat generation amount control device 12, into the semiconductor laser 23 that the recording/ reproducing head 14 includes. Then, the semiconductor laser 23 irradiates, on the recording head 25, light of light output corresponding to the driving current value, so as to produce evanescent light. As a result, the magnetic recording medium 3 is heated by the evanescent light. Further, the recording/reproduction signal processing section 15 demodulates, into a digital signal, the high-frequency signal current that is reproduced by the reproducing head 22, and reproduces the information that is recorded on the magnetic recording medium.

Figure 7:
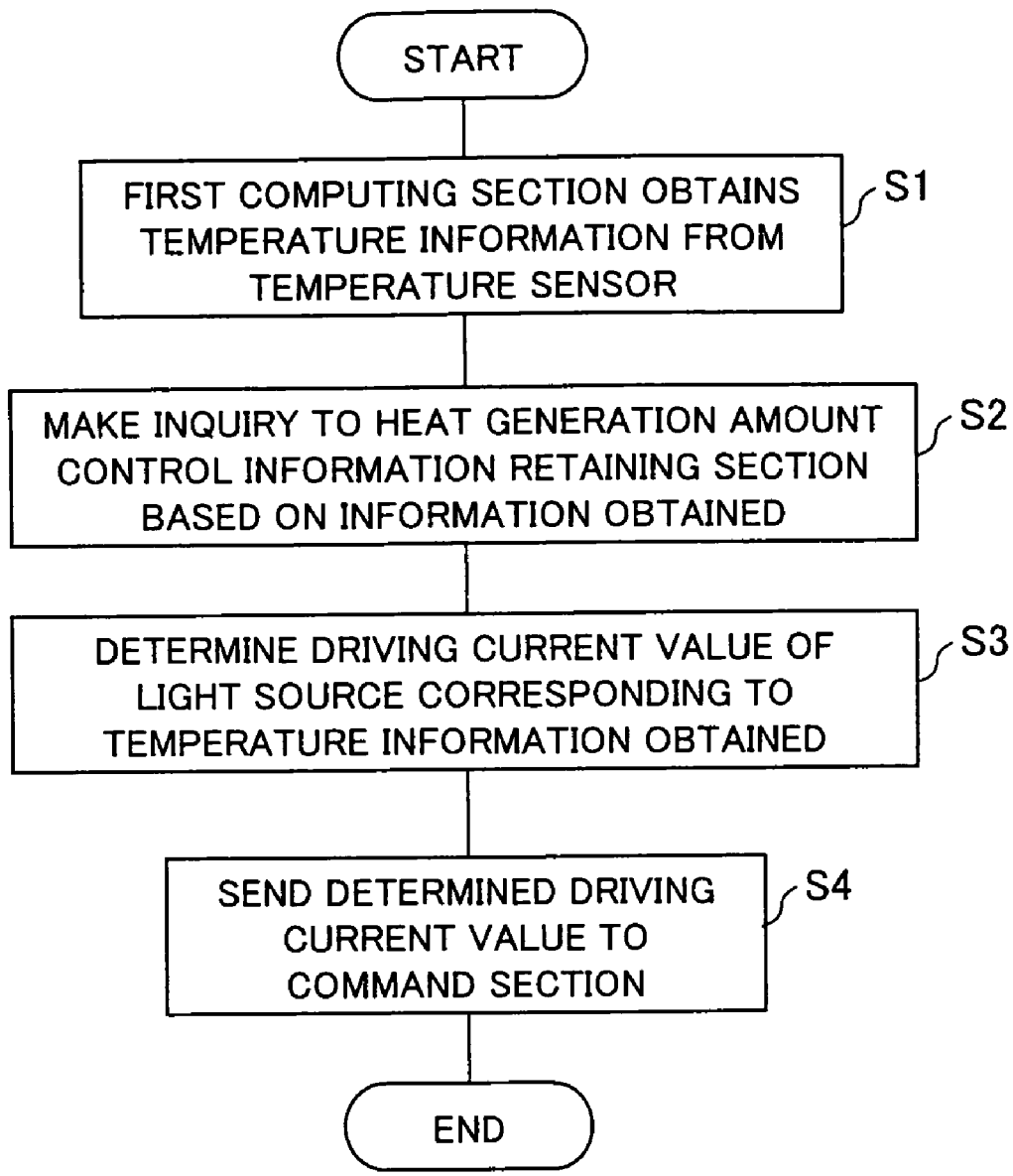
FIG. 7 is a flow chart illustrating an operational flow of the heat generation amount control device.

Next, the following explains an operational flow at the heat generation amount control device 12 of the present embodiment, with reference to FIG. 7.

First, in the step S1, the first computing section 41 obtains temperature information on a temperature inside the magnetic recording/reproducing device 1 from the temperature sensor 13. Then, in the step S2, based on thus obtained temperature information, the first computing section 41 makes an inquiry to the heat generation amount control information retaining section 16. In the step S3, the first computing section 41 determines a driving current value of the semiconductor laser 23 which driving current value corresponds to the temperature information. Further, in the step S4, the driving current value determined by the first computing section 41 is sent to the command section 17.

The present embodiment is arranged such that the heat generation amount control device 12 does not to include the command section 17. However, the arrangement of the heat generation amount control device 12 is not limited to this. For example, the heat generation amount control device 12 may include the command section 17.

Figure 8:
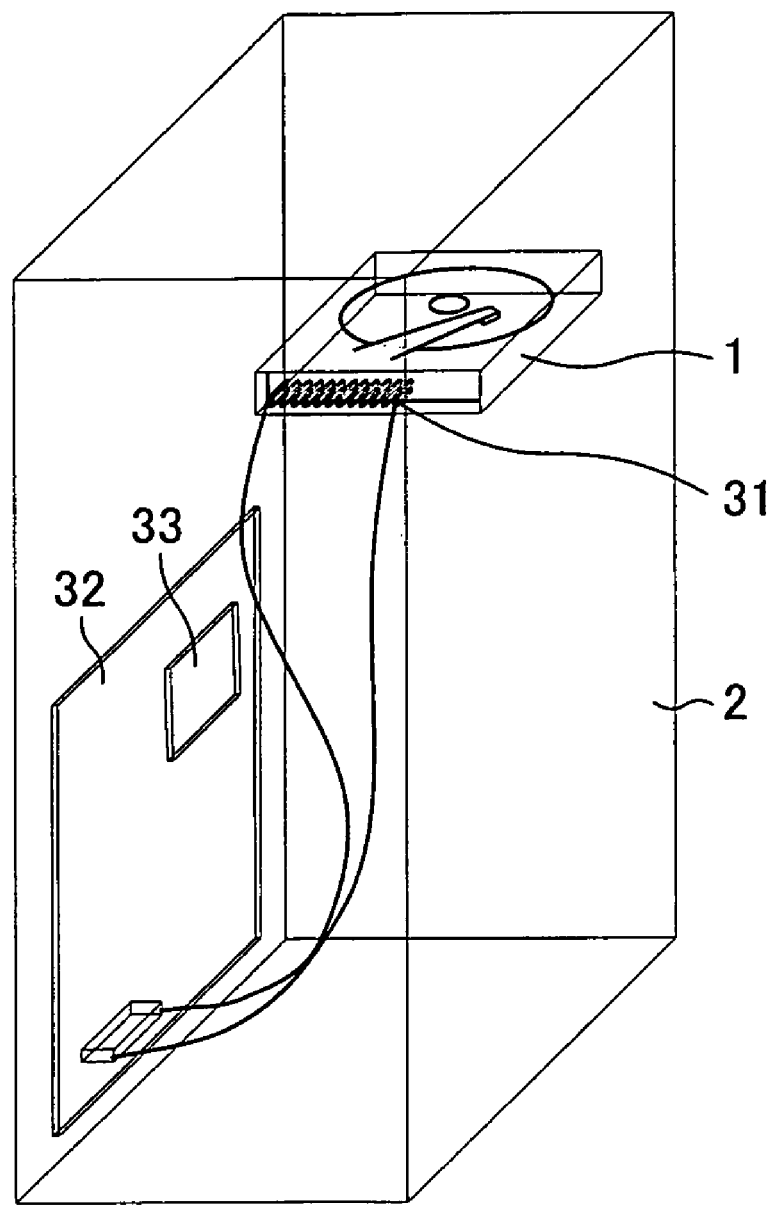
FIG. 8 is a diagram schematically illustrating an arrangement of a case where a magnetic recording/reproducing device of the present invention is provided in a personal computer that is an external device.

In the present embodiment, the temperature sensor 13 is explained to be provided inside the magnetic recording/reproducing device 1. However, as illustrated in FIG. 8, a temperature sensor (temperature detection means) 33 may be provided outside the magnetic recording/reproducing device 1. The following explains a specific arrangement in a case where the temperature sensor 33 is provided outside the magnetic recording/reproducing device 1.

As illustrated in FIG. 8, the magnetic recording/reproducing device 1 is connected to a personal computer 2 that is an external device via a signal input/output terminal 31 that is provided to the magnetic recording/reproducing device 1. In this case, the magnetic recording/reproducing device 1 takes in temperature information from a temperature sensor 33 that is provided in a motherboard 32 built in the personal computer 2. Then, the heat generation amount control device 12 determines, based on this temperature information, the driving current value to the semiconductor laser 23.

In a case where the temperature sensor 33 is provided outside the magnetic recording/reproducing device 1, a difference between a temperature inside the magnetic recording/reproducing device 1 and a temperature inside the personal computer 2 should be measured in advance, and the heat generation amount control information retaining section 16 should store the temperature inside the magnetic recording/reproducing device 1, the temperature inside the personal computer 2, and the heat generation amount control information (driving current value) which are arranged to correspond to one another. The method of arranging the temperature inside the magnetic recording/reproducing device 1, the temperature inside the personal computer 2, and the heat generation amount control information to correspond to one another may be the same method as the method of recording, in the production of the magnetic recording/reproducing device 1, respective driving current values of the semiconductor laser 23 at temperatures in an operation temperature range of the magnetic recording/reproducing device 1 and the temperatures corresponding to the respective driving current values.

Moreover, the external device is not limited to the personal computer 2. Various information devices may be used as the external device. Examples of the external devices are a mobile terminal (e.g., a portable phone or a PDA), a portable game machine, an AV recording/reproducing device, a digital still camera, and a digital movie camera. By utilizing the temperature sensor 33 provided to the external device, the magnetic recording/reproducing device 1 does not need to include a temperature sensor. Therefore, cost reduction of the magnetic recording/reproducing device 1 is possible. Alternatively, both the temperature sensor 33 and the temperature sensor 13 may be provided. In this case, the heat generation amount control device 12 may predict a temperature variation inside the magnetic recording/reproducing device 1 by utilizing the temperature sensor 13 inside the magnetic recording/reproducing device 1 and the temperature sensor 33 outside the magnetic recording/reproducing device 1, so as to determine the driving current value to the semiconductor laser 23. Such prediction of the temperature variation can be performed by calculating a difference between the temperature that is detected by the temperature sensor 13 and the temperature that is detected by the temperature sensor 33. For example, in a case where the temperature that is detected by the temperature sensor 33 is lower than the temperature that is detected by the temperature sensor 13, it is predictable that the temperature inside the magnetic recording/reproducing device 1 will decrease. Further, a degree of the decrease in the temperature inside the magnetic recording/reproducing device 1 can be estimated from a difference between the temperature that is detected by the temperature sensor 13 and the temperature that is detected by the temperature sensor 33.

The present embodiment explains an arrangement in which the recording head 25, the reproducing head 22, and the semiconductor laser 23 that is a light source are integrated. However, the present invention is not limited to this. For example the semiconductor laser 23 may be separate from the recording head 25. Further, the present invention may be arranged such that the light emitted from the semiconductor laser 23 is irradiated on the recording head 25 via an optical fiber or via a light guide.

Furthermore, the present invention may be arranged such that the magnetic recording medium 3 is heated by irradiating the light emitted from the semiconductor laser 23 directly on the magnetic recording medium 3. Furthermore, the present invention may be arranged such that a lens such as a gradient index lens or a diffractive lens is provided between the semiconductor laser 23 and the magnetic recording medium 3 so that the light is focused on the magnetic recording medium 3.

Other than the arrangements described above, the present invention may be arranged such that the recording head 25 itself is heated by irradiating light on the recording head 25. The same effect as in the arrangement described above can be obtained by an arrangement in which the recording area or the reproduction area of the magnetic recording medium 3 is heated by the heat of thus heated recording head 25.

For example, even in the case of the recording head 25 as illustrated in FIG. 5, some heat is generated in the recording head 25 itself because light is irradiated on the metal thin line 26. Therefore, if the recording head 25 floats above the magnetic recording medium 3 and an amount of the space between the recording head 25 and the magnetic recording medium 3 is small, the effect of heating the magnetic recording medium 3 due to the heat generation of the recording head 25 can be anticipated. Therefore, even in the case of complex heat generation means in which the magnetic recording medium 3 is heated (i) by irradiating, on the magnetic recording medium 3, the evanescent light produced by irradiation of light on the metal thin line section 26 and concurrently (ii) by heat from heat generation of the recording head 25 itself, information on a plurality of temperatures and heat generation amount control information corresponding to the plurality of temperatures are recorded, in advance, in the heat generation mount control information retaining section 16. This easily makes it possible to appropriately carry out at least either recording or reproduction with respect to the magnetic recording medium 3 in accordance with the temperature variation in the case of the complex heat generation means.

Moreover, the present embodiment has an arrangement in which a flash memory that is a semiconductor memory is used in the magnetic recording/reproducing device 1 as the heat generation amount control information retaining section 16. However, the present invention is not limited to this arrangement. For example, the magnetic recording medium 3 may be the generation amount control information retaining section 16. In this case, because the semiconductor memory become unnecessary, cost reduction of the magnetic recording/reproducing device 1 becomes possible. Meanwhile, in a case where the heat generation amount control information is recorded in a semiconductor memory, the heat generation amount control information cannot be read out when the semiconductor memory breaks down. However, in a case where the magnetic recording/reproducing device 1 includes a plurality of magnetic recording mediums 3, the same heat generation amount control information is recorded in each magnetic recording medium 3. This makes it possible that, even in a case where one of the magnetic recording mediums 3 or the recording/reproducing heads 14 breaks down, the heat generation amount control information can be read out by reading the heat generation amount control information that is recorded in other magnetic recording medium 3.

According to the arrangement, based on the temperature information obtained from the temperature sensor 13 at the time of carrying out recording or reproduction, an inquiry is made to the heat generation amount control information retaining section 16. This makes it possible to obtain the driving current value as the heat generation amount control information corresponding to the temperature information that is recorded in the heat generation amount control information retaining section 16. As a result, test writing or test reading becomes unnecessary, or frequency of test writing or test reading can be reduced. Moreover, even in a case where the temperature inside the magnetic recording/reproducing device 1 varies, the driving current value to be inputted into the semiconductor laser 23 that is a light source can be set, in accordance with temperature variation, to a value appropriate for carrying out recording or reproduction with respect to the magnetic recording medium 3. This makes it possible to prevent wrong erasing or recording error of user data.

[Embodiment 2]

Figure 9:
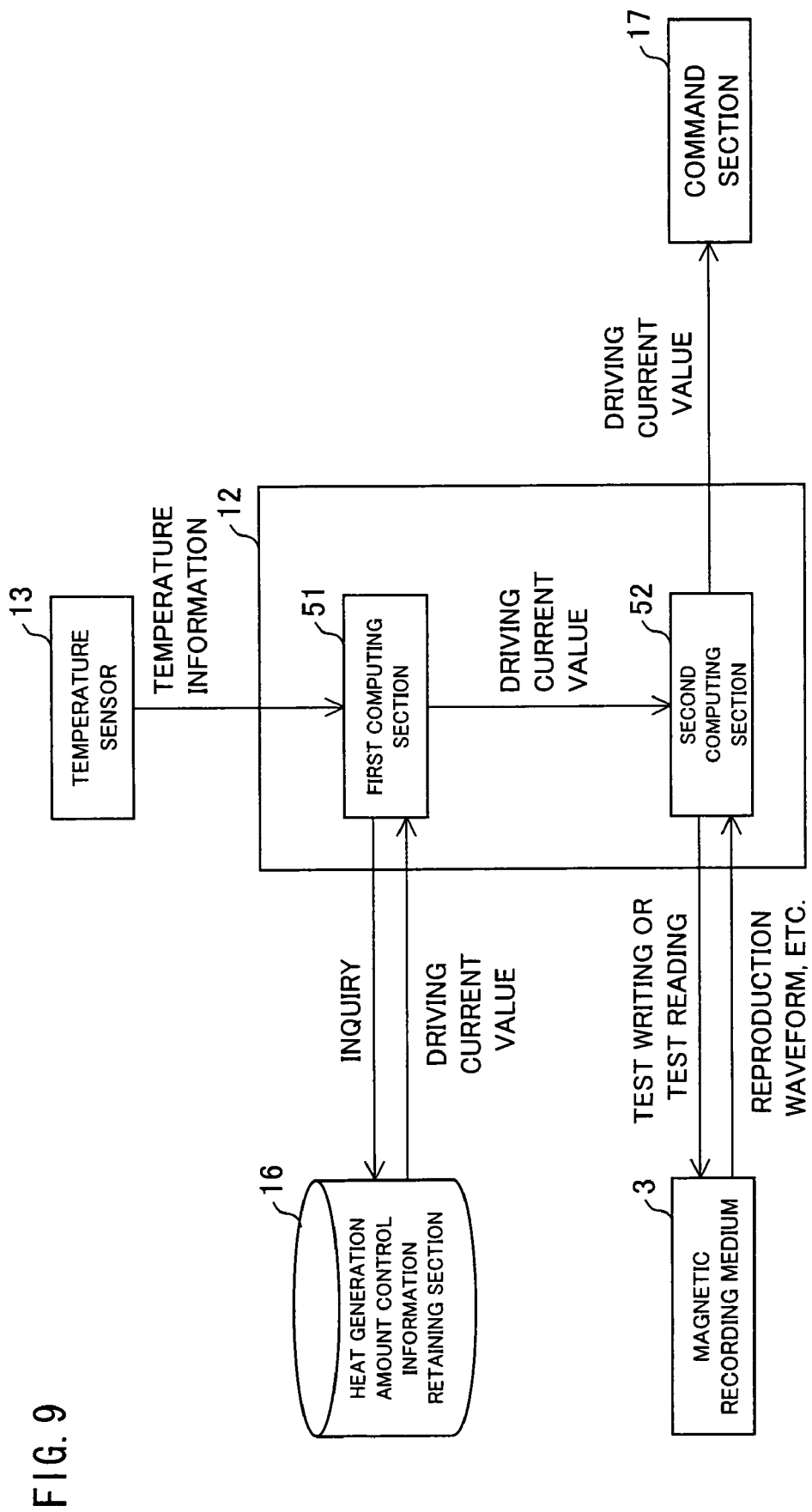
FIG. 9 is a functional block diagram illustrating another embodiment of a heat generation amount control device of the present invention.
Figure 10:
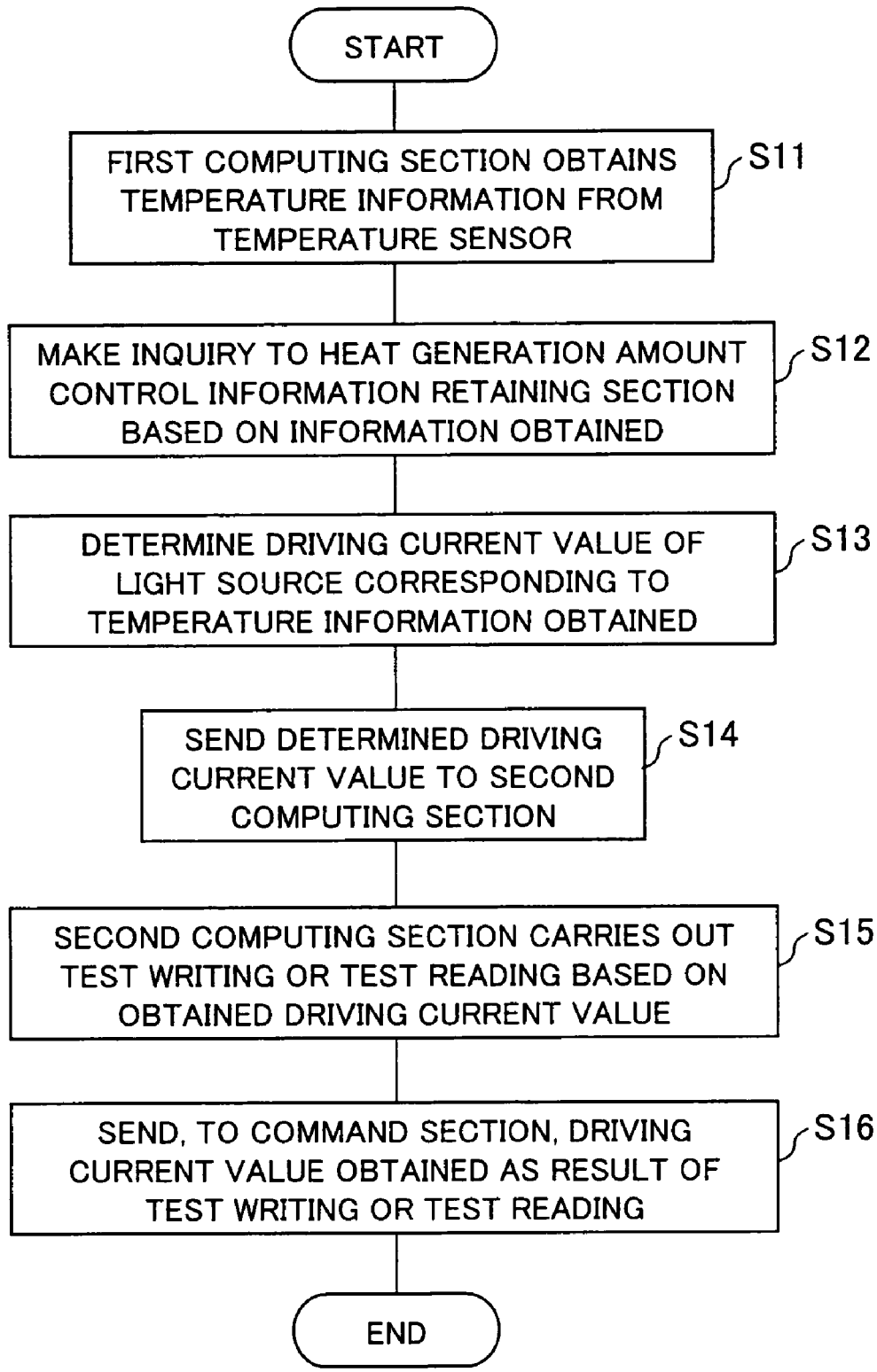
FIG. 10 is a flow chart illustrating an operational flow of the heat generation amount control device of the another embodiment of the present invention.

The following explains another embodiment of the present invention, with reference to FIGS. 9 and 10. An arrangement other than an arrangement explained in the present embodiment is the same as an arrangement in the Embodiment 1. For convenience of an explanation, members given the same reference numerals as the members explained in the Embodiment 1 respectively have identical functions and the explanations thereof are omitted. A heat generation amount control device 12 of the present embodiment is different from that in the arrangement of the Embodiment 1 in that the heat generation amount control device 12 of the present embodiment includes a second computing section 52 that carries out test wiring and/or test reading.

First, the test wiring is explained. Test writing, in general, is to determine an optimum recording condition for carrying out recording with respect to the recording medium. In the test writing, for the purpose of optimizing a condition in recording a signal into the recording medium, recording is carried out with respect to a recording medium (magnetic recording medium 3) while a condition for the recording is varied, and a signal quality is evaluated by reproducing the signal recorded. The test writing in the present embodiment is to determine a driving current value capable of causing a semiconductor laser 23 to perform light output appropriate for carrying out recording on a magnetic recording medium 3 that is a heat-assisted recording medium. Moreover, the heat generation amount control device 12 of the present embodiment carries out the test writing according to the steps that are the same as the steps for determining heat generation amount control information in production of a magnetic recording/reproducing device 1 as explained in the Embodiment 1.

Meanwhile, test reading, in general, is to determine an optimum reproduction condition in reproduction from the recording medium. In the test reading, for the purpose of optimizing a condition to reproduce a signal recorded on the recording medium (magnetic recording medium 3), a signal recorded on the recording medium on the recording medium is reproduced while a condition for reproduction is varied, and a reproduced signal quality is evaluated. The test reading in the present embodiment is to determine a driving current value capable of causing the semiconductor laser 23 to perform light output appropriate for reproduction of a record from the magnetic recording medium 3 that is a heat-assisted recording medium.

Next, the following explains an arrangement of the heat generation amount control device 12 of the present embodiment, with reference to FIG. 9. FIG. 9 is a functional block diagram of the heat generation mount control device 12 in the present embodiment.

The heat generation amount control device 12, as illustrated in FIG. 1, includes a first computing section (first computing means) 51 and the second computing section (second computing means) 52.

The first computing section 51 carries out calculation according to predetermined steps, based on temperature information that is obtained from the temperature sensor 13. Specifically, in the calculation, the first computing section 51 makes an inquiry to a heat generation amount control information retaining section 16 for a temperature and information on a driving current value corresponding to the temperature, according to the temperature information that is obtained from the temperature sensor 13, and determines a driving current value, as heat generation amount control information corresponding to the temperature information. The driving current value that is determined by the first computing section 51 is sent to the second computing section 52.

The second computing section 52 carries out predetermined test wiring and/or predetermined test reading with respect to the magnetic recording medium 3. The second computing section 52 uses the driving current value that is sent from the first computing section 51 or a driving current value that is smaller than the driving current value that is sent from the first computing section 51, at the start of the test wiring and/or the test reading. Then, a driving current value obtained by the second computing section 52 as a result of the test writing and/or the test reading is sent to a command section 17 as a driving current value to be used in actual recording and/or actual reproduction.

The following explains the test writing that is performed by the second computing section 52.

The second computing section 52 first sends, to the command section 17, the driving current value that is sent from the first computing section 51, and drives the semiconductor laser 23. Then, light is irradiated on a metal thin line section 26 of the recording head 25 so that evanescent light is produced, and the magnetic recording medium 3 is heated. Simultaneously, a high-frequency signal current corresponding to information to be recorded is obtained from a recording/reproduction signal processing section 15 and inputted into the metal thin line section 26 of the recording head 25. Subsequently, information is recorded on the magnetic recording medium 3.

After the information is recorded on the magnetic recording medium 3, reproduction of the recorded information is carried out by the reproducing head 22. Then, for example, a reproduction signal waveform is detected and compared with a reference signal waveform so as to measure a signal evaluation index. In a case where a result of the comparison between the reference signal waveform and the reproduction waveform is used as the signal evaluation index, a mean squared error value of a discrete sampling data (an average value of a squared difference between output values of respective sampling data points of the waveforms) is used. Other than the mean squared error value, for example, a jitter value, an error rate, or a signal amplitude value may be used as the signal evaluation index.

Subsequently, in a case where the value of the signal evaluation index is less than the reference value, the driving current value to be inputted into the semiconductor laser 23 is increased and recording is performed again. Then, at a stage where the value of the signal evaluation index reaches the reference value, the temperature information of the temperature sensor 13 and the driving current value of the semiconductor laser 23 at the stage are recorded in the heat generation amount control information retaining section 16. The reference value of the signal evaluation index here is a value that varies depending on a type of an evaluation value that is used as the signal evaluation index. In the case of using the mean squared error value as a result of comparison between the reference signal waveform and the reproduction waveform, the jitter value, or the error rate as the signal evaluation index, the signal evaluation value index should be not more than a predetermined reference value. Meanwhile, in the case of using the signal amplitude value as the signal evaluation index, the value of the signal evaluation index should be not less than a predetermined reference value. Moreover, the reference value is a value that is set as appropriate as a value capable of ensuring that, if a signal can attain a signal evaluation value not less than a certain "reference value", a burst error does not occur, that is, the signal is not read as wrong data after signal processing such as an error correction.

Next, the following explains a test reading that is performed by the second computing section 52. When the magnetic recording medium 3 is a heat-assisted reproduction medium that is a medium heated at the time of reproduction, it is preferable to carry out test reading. In the magnetic recording medium 3, a reference signal for test reading is recorded in advance, and the reference signal is reproduced at the test reading.

The second computing section 52 first sends, to the command section 17, a driving current value that is sent from the first computing section 51, or a driving current value smaller than the driving current value that is sent from the first computing section 51, so that the semiconductor laser 23 is driven. Then, light is irradiated on the metal thin line section 26 of the recording head 25 so that evanescent light is produced, and the magnetic recording medium 3 is heated. Because recording is not carried out at the time of reproduction, a high-frequency signal current is not inputted from the recording/reproduction signal processing section 15 into the metal thin line section 26 of the recording head 25.

Subsequently, reproduction of the reference signal for the test reading is carried out by the reproducing head 22. Then, for example, a reproduction signal waveform is detected and compared with a reference signal waveform, so that the signal evaluation index is measured. A mean error square value of discrete sampling data (an average value of a squared difference between respective output values of sampled data points of the waveforms) is used in a case where a result of the comparison between the reference signal waveform and the reproduction waveform is used as the signal evaluation index. Other than this, for example, a jitter value, an error rate, or a signal amplitude value can be used as the signal evaluation index.

Subsequently, in a case where a value of the signal evaluation index is less than the reference value, reproduction is carried out again after the driving current value inputted into the semiconductor laser 23 is increased. Then, at a stage where the value of the signal evaluation index reaches the reference value, the temperature information of the temperature sensor 13 and the driving current value of the semiconductor laser 23 at the stage are recorded in the heat generation amount control information retaining section 16. The reference value here is the same as that in the explanation of the test writing.

Next, the following explains an operational flow in the heat generation amount control device 12 of the present embodiment, with reference to FIG. 10.

First, in the step S11, the first computing section 51 obtains temperature information on a temperature inside the magnetic recording/reproducing device 1 from the temperature sensor 13. Then, in the step S12, based on thus obtained temperature information, the first computing section 51 makes an inquiry to the heat generation amount control information retaining section 16. Subsequently, in the step S13, the first computing section 51 determines a driving current value to the semiconductor laser 23 which driving current value corresponds to the temperature information.

In the step S14, the driving current value that is determined by the first computing section 51 is sent to the second computing section 52. Then, in the step S15, the second computing section 52 starts test writing or test reading with the use of the driving current value that is determined by the first computing section 51. Further, in the step S16, the second computing section 52 sends, to the command section 17, the driving current value appropriate for carrying out recording or reproduction with respect to the magnetic recording medium 3. This driving current value is obtained as a result of the test writing or the test reading.

In a case where the magnetic recording medium 3 is a heat-assisted recording/reproduction medium that requires heating both at the time of recording and at the time of reproduction, both the test writing and the test reading may be carried out by repeating the flow from the step S11 to the step S16.

Moreover, after an optimum driving current value is determined as a result of the test writing or the test reading, it is preferable to start carrying out recording/reproduction of information with respect to the magnetic recording medium 3 and concurrently to record the temperature at the time when the optimum driving current value is obtained and the optimum driving current value.

Consequently, when next test writing or next test reading is carried out after once test writing or test reading is carried out, it becomes possible to set conditions for starting the next test wiring or the next test reading according to a temperature at the time of the next test writing or the next test reading with reference to a temperature and heat generation amount control information. Therefore, it becomes possible to carry out, in a shortened time, test writing or test reading appropriate for a temperature at the time of the test writing or the test reading.

Moreover, it is preferable that the second computing section 52 retains temperature information at the time when at least either test writing or test reading is carried out, and concurrently, at least either the test writing or test reading is carried out again in a case where a value of the temperature information obtained from the temperature sensor 13 becomes different from the retained temperature information by not less than a predetermined value. The predetermined value here is explained below. An amount of light outputted from the semiconductor laser 23 varies in accordance with variation in temperature. Due to an influence of the variation in the amount of light, the temperature variation amount of the magnetic recording medium 3 to be heated also varies. When the temperature of the magnetic recording medium 3 varies, a size of an area where information is recorded varies. As a result, an error rate increases or cross erasing occurs. The predetermined value is a value of temperature variation from the retained temperature to a temperature obtained from the temperature sensor 13. At this value of temperature variation, the occurrence of a burst error may start due to the increase in the error rate or the cross erasing.

In other words, in a case where a difference between the temperature at previous test writing or previous test reading and the temperature at present becomes not less than the predetermined value, the second computing section 52 makes an inquiry for a record of the heat generation amount control information in the heat generation amount control information retaining section 16. In a case where applicable record information on the temperature is present, the driving current value that is obtained from the record information is inputted into the semiconductor laser 23. If there is no applicable record information, next test writing or next test reading is carried out. This makes it possible to deal with the temperature variation inside the magnetic recording/reproducing device 1. The record information is a driving current value as heat generation amount control information in the past which driving current value is recorded in the heat generation amount control information retaining section 16 as a result of test writing or test reading. A part of the record includes the driving current value that is recorded at the time of producing the magnetic recording/reproducing device 1.

According to the arrangement, test writing or test reading is carried out according to temperature variation. Therefore, even in a case where the magnetic recording/reproducing device 1 utilizing the heat generation amount control device 12 of the present invention is operated for long hours, recording or reproduction is carried out with respect to the magnetic recording medium 3, based on the heat generation amount control information in accordance with the temperature variation. Therefore, it becomes possible to carry out more stable recording or reproduction with respect to the magnetic recording medium 3.

Further, it is possible to output, to an external device (for example, a personal computer 2) via a signal input/output terminal 31 that is provided in the magnetic recording/reproducing device 1, temperature information on a temperature inside the magnetic recording/reproducing device 1 and a driving current value as the heat generation amount control information that are obtained as a result of the test writing or the test reading. This makes it possible to monitor, at the external device, the temperature and the driving current value of the magnetic recording/reproducing device 1. Therefore, a user may judge a state of the magnetic recording/reproducing device 1 and stop the magnetic recording/reproducing device according to conditions of the temperature and the driving current value of the magnetic recording/reproducing device 1.

Furthermore, information that is outputted to the external device may be the temperature and the driving current value as the heat generation amount control information which temperature and driving current value are recorded in advance in the production of the magnetic recording/reproducing device 1. For example, by monitoring and comparing, via the external device, (i) the driving current value and the temperature information which are obtained as a result of test writing or test reading and (ii) the driving current value and the temperature information that are recorded in advance, the conditions of the magnetic recording/reproducing device 1 can be more precisely determined.

The present embodiment explains an arrangement including two computing sections of the first computing section 51 and the second computing section 52. The first computing section 51 and the second computing section 52 are illustrated as two divided sections as functional blocks. The present invention is not necessarily limited to this arrangement. For example, the first computing section 51 and the second computing section 52 may be provided as independent members, respectively, or, alternatively, the first computing section 51 and the second computing section 52 may be provided as one member.

[Embodiment 3]

Figure 11:
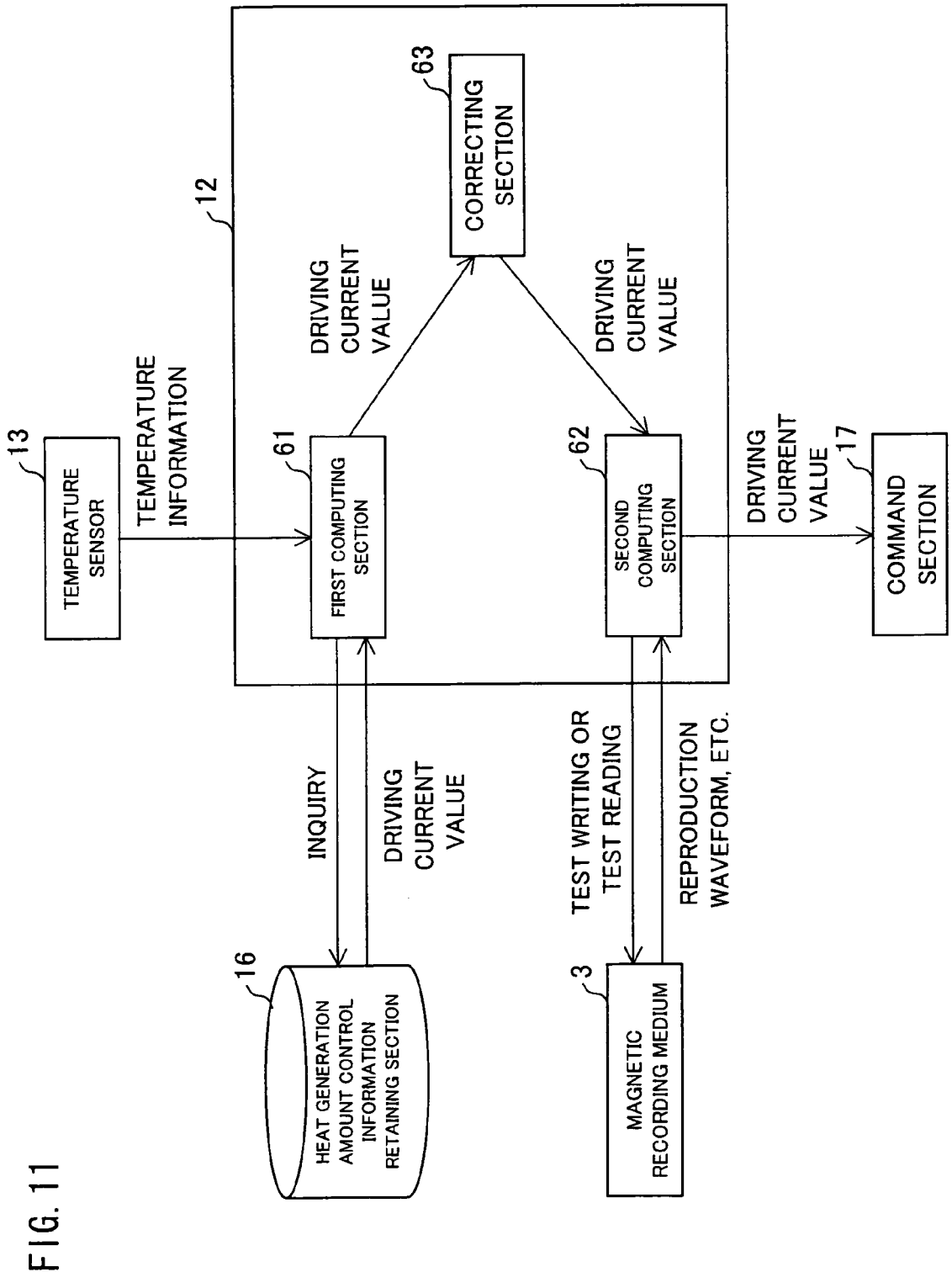
FIG. 11 is a functional block diagram illustrating still another embodiment of a heat generation amount control device of the present invention.
Figure 12:
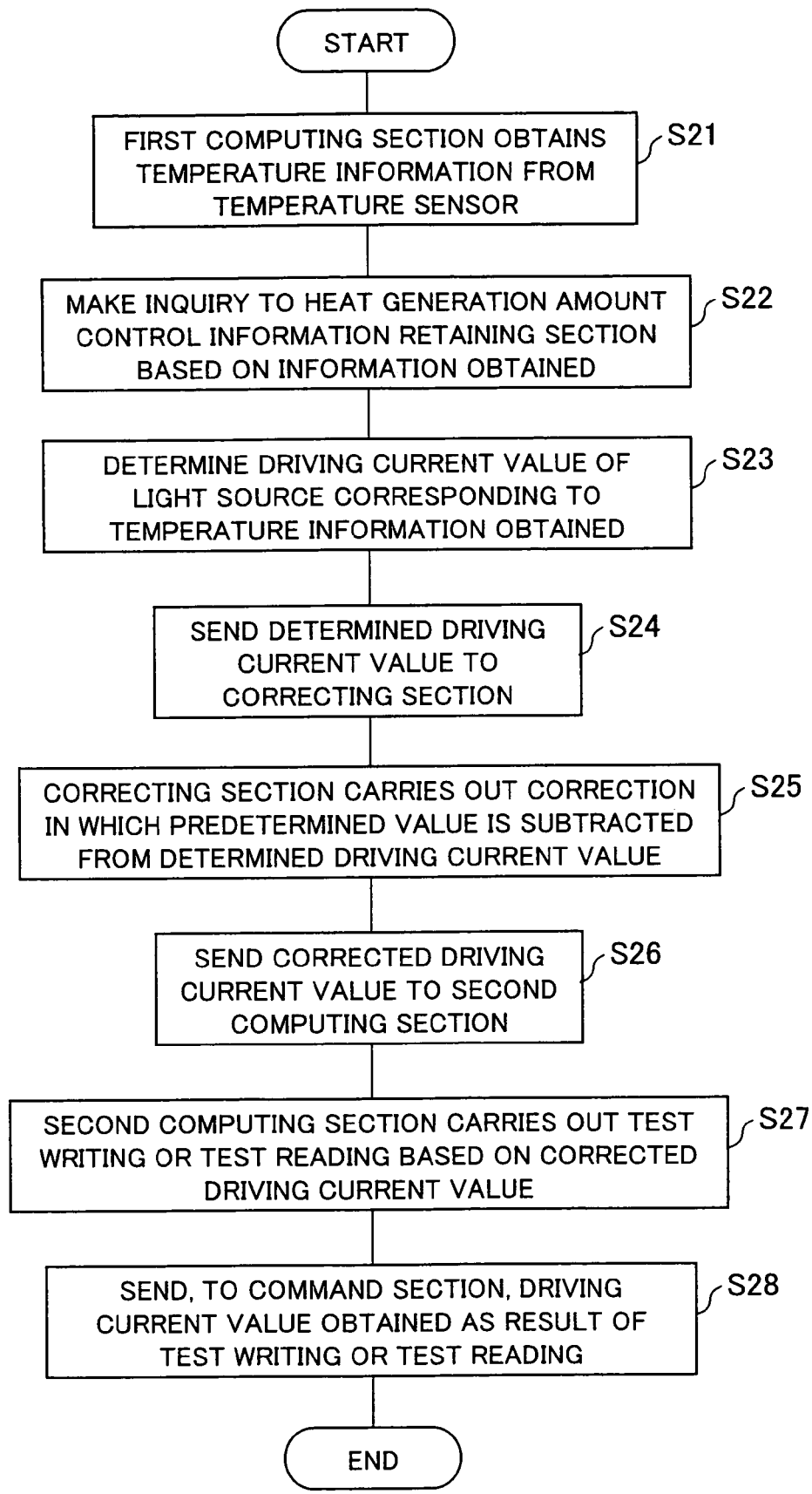
FIG. 12 is a flow chart illustrating an operational flow of the heat generation amount control device of the still another embodiment of the present invention.

The following explains another embodiment of the present invention, with reference to FIGS. 11 and 12. An arrangement other than an arrangement explained in the present embodiment is the same as an arrangement in the Embodiment 2. For convenience of an explanation, members given the same reference numerals as the members explained in the Embodiments 1 and 2 respectively have identical functions and the explanations thereof are omitted. A heat generation amount control device 12 of the present embodiment is different from the arrangement of the Embodiment 2 in that the heat generation amount control device 12 of the present embodiment includes a correcting section 63.

First, an arrangement of the heat generation amount control device 12 of the present embodiment is explained with reference to FIG. 11. FIG. 11 is a functional block diagram of the heat generation amount control device 12 of the present embodiment.

As illustrated in FIG. 11, the heat generation amount control device 12 includes a first computing section (first computing means) 61, a second computing section (second computing means) 62, and a correcting section (correction means) 63.

The first computing section 61 performs calculation according to predetermined steps, based on temperature information obtained from a temperature sensor 13. Specifically, in the calculation, the first computing section 61 makes an inquiry to a heat generation amount control information retaining section 16, according to the temperature information that is obtained from the temperature sensor 13, so that a driving current value as heat generation amount control information corresponding to the temperature information is determined. The driving current value obtained by the first computing section 61 is sent to the correcting section 63.

The second computing section 62 carries out predetermined test wiring and/or predetermined test reading with respect to the magnetic recording medium 3. The second computing section 62 uses the driving current value that is sent from the correcting section 63, at the start of the test writing or test reading. Then, a driving current value obtained as a result of the test writing and/or the test reading by the second computing section 62 is sent to a command section 17 as a driving current value to be used in actual recording and/or actual reproduction.

The correcting section 63 carries out correction in which a predetermined value is subtracted from the driving current value that is sent from the first computing section 61. Thus corrected driving current value is sent to the second computing section 62.

Next, the following explains a method of preventing wrong erasing of a signal due to light output more than necessary, which signal is recorded on a track that is a target of recording or an adjacent track.

At the time of carrying out recording or reproduction of information with respect to the magnetic recording medium 3, the heat generation amount control device 12 obtains information on a temperature inside a magnetic recording/reproducing device 1 from the temperature sensor 13. The heat generation amount control device 12 makes an inquiry to the heat generation amount control information retaining section 16 for the temperature information and obtains heat generation amount control information corresponding to the temperature information. Then, the heat generation amount control device 12 sends, to the correcting section 63, the heat generation amount control information, that is, the driving current value to be inputted into the semiconductor laser 23. Here, because the temperature that is measured by the temperature sensor may have an error, the correcting section 63 subtracts a predetermined value from the driving current value of the semiconductor laser which driving current value is obtained from the first computing section 61. Then, the correcting section 63 sends, to the second computing section 62, the driving current value from which a predetermined value is subtracted. Subsequently, this driving current value is used as a driving current value to be inputted into the semiconductor laser 23 at the time of starting the test writing or the test reading.

Next, the following explains an operational flow at the heat generation amount control device 12 of the present invention, with reference to FIG. 12.

First, in the step S21, the first computing section 61 obtains the temperature information on a temperature inside the magnetic recording/reproducing device 1 from the temperature sensor 13. Next, in the step S22, based on thus obtained temperature information, the first computing section 61 makes an inquiry to the heat generation amount control information retaining section 16. Then, in the step S23, the first computing section 61 determines the driving current value to the semiconductor laser 23 which driving current value corresponds to the temperature information. Further, in the step S24, the first computing section 61 sends the driving current value that is determined by the first computing section 61 to the correcting section 63.

In the step S25, the correcting section 63 carries out correction in which a predetermined value is subtracted from the driving current value that is determined by the first computing section 61. Subsequently, in the step S26, the correcting section 63 sends, to the second computing section 62, thus corrected driving current value. In the step S27, the second computing section 62 starts test writing or test reading by using the driving current value that is corrected by the correcting section 63. Then, in the step S28, the second computing section 62 sends, to the command section 17, a driving current value appropriate for carrying out recording or reproduction with respect to the magnetic recording medium 3 which driving current value is obtained as a result of the test writing or the test reading.

In a case where the magnetic recording medium 3 is a heat-assisted recording/reproduction medium that requires heating both at the time of recording and at the time of reproduction, both the test writing and the test reading may be carried out by repeating the flow from the step S21 to the step S28.

The present embodiment explains an arrangement including three sections of the first computing section 61, the second computing section 62, and the correcting section 63. The first computing section 61, the second computing section 62, and the correcting section 63 are illustrated as three divided sections as functional blocks. The present invention is not necessarily limited to this arrangement. For example, the first computing section 61, the second computing section 62, and the correcting section 63 may be included as independent members, respectively, or, alternatively, the first computing section 61, the second computing section 62, and the correcting section 63 may be provided as one member.

According to the arrangement, it is possible to prevent wrong erasing of a signal due to light output more than necessary from the semiconductor laser 23, which signal is recorded on a track that is a target of recording or an adjacent track, or to prevent a damage to the magnetic recording medium 3 due to such light output.

[Embodiment 4]

Figure 13:
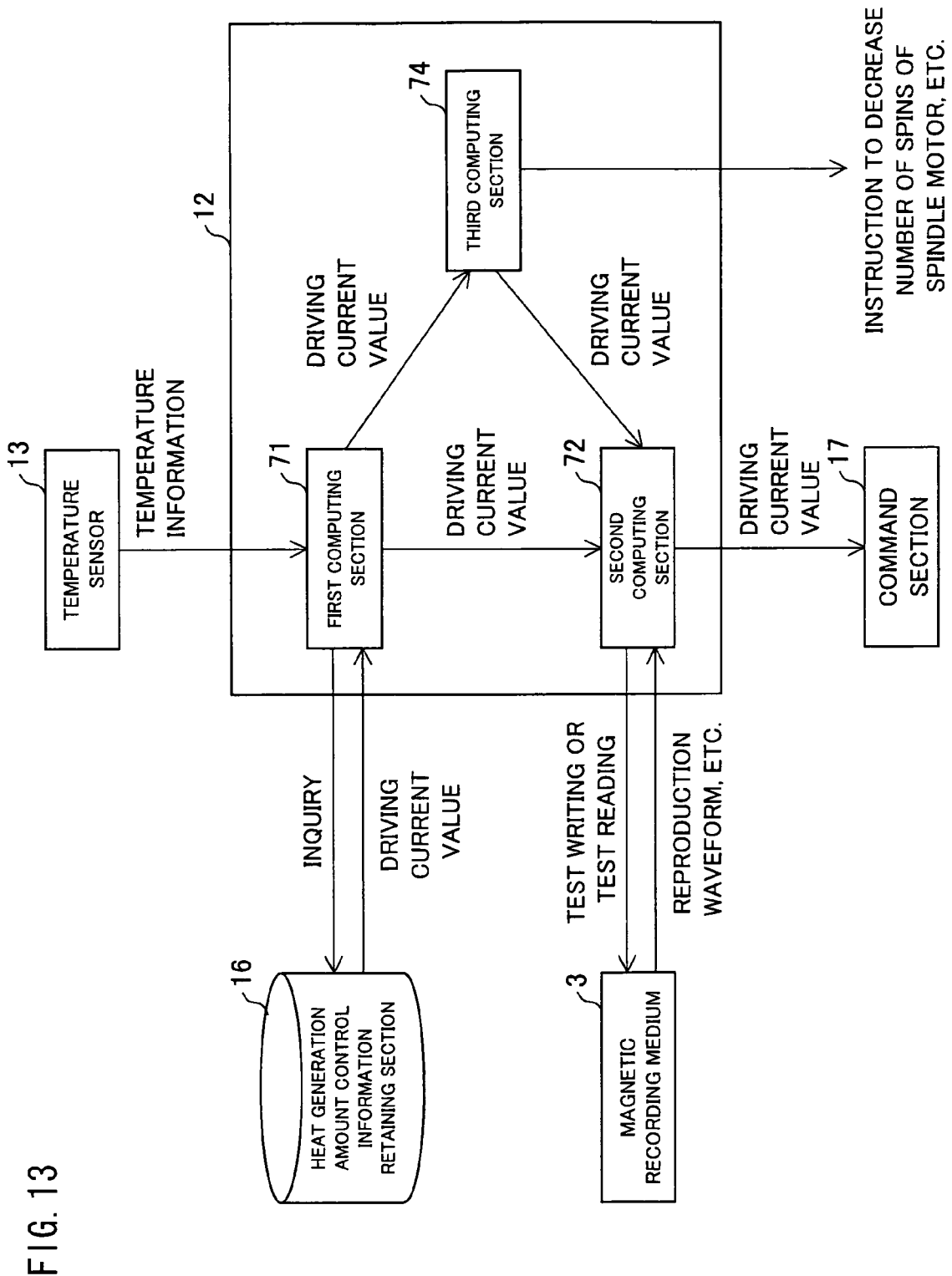
FIG. 13 is a functional block diagram illustrating yet another embodiment of a heat generation amount control device of the present invention.
Figure 14:
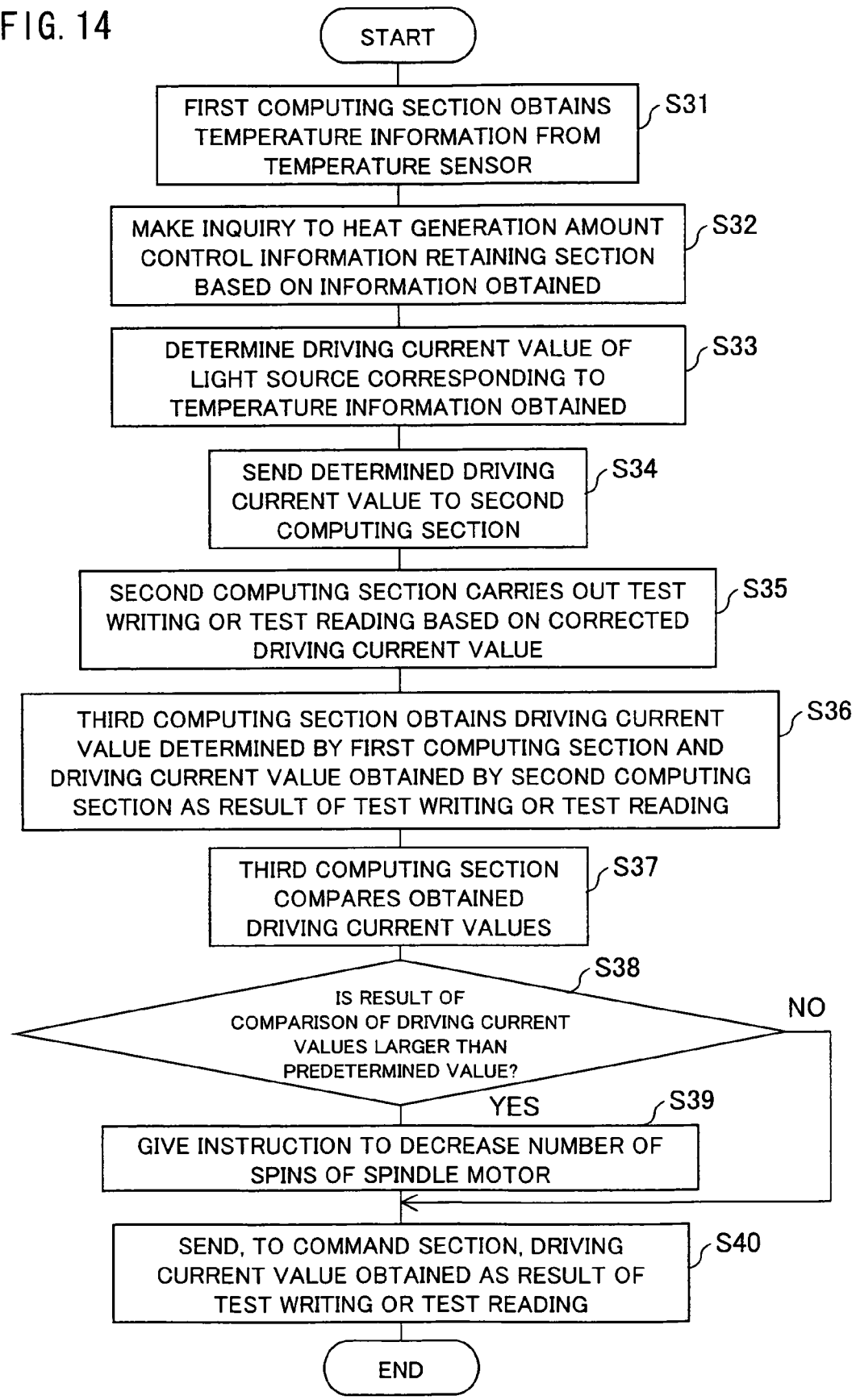
FIG. 14 is a flow chart illustrating an operational flow of the heat generation amount control device in the yet another embodiment of the present invention.

The following explains another embodiment of the present invention, with reference to FIGS. 13 and 14. An arrangement other than an arrangement explained in the present embodiment is the same as an arrangement in the Embodiment 2. For convenience of an explanation, members given the same reference numerals as the members explained in the Embodiments 1 and 2 respectively have identical functions and the explanations thereof are omitted. A heat generation amount control device 12 of the present embodiment is different from the arrangement of the Embodiment 2 in that the heat generation amount control device 12 of the present embodiment includes a correcting section 63.

First, an arrangement of the heat generation amount control device 12 of the present embodiment is explained, with reference to FIG. 13. FIG. 13 is a functional block diagram of the heat generation amount control device 12 of the present embodiment.

As illustrated in FIG. 13, the heat generation amount control device 12 includes a first computing section (first computing means) 71, a second computing section (second computing means) 72, and a third computing section (third computing means) 74.

The first computing section 71 carries out calculation according to predetermined steps, based on temperature information obtained from a temperature sensor 13. Specifically, in the calculation, the first computing section 71 makes an inquiry to a heat generation amount control information retaining section 16, according to the temperature information obtained from the temperature sensor 13, so that a driving current value as heat generation amount control information corresponding to the temperature information is determined. The driving current value obtained by the first computing section 71 is sent to the second computing section 72.

The second computing section 72 carries out predetermined test wiring and/or test reading with respect to the magnetic recording medium 3. The second computing section 72 uses the driving current value that is sent from the first computing section 71, for starting the test writing and/or the test reading. Then, a driving current value obtained as a result of the test writing and/or the test reading by the second computing section 72 is sent, to a command section 17, as a driving current value to be used in actual recording and/or actual reproduction.

The third computing section 74 obtains and compares driving current values that are determined by the first computing section 71 and the second computing section 72, respectively. As a result of the comparison, in a case where a degree of deterioration of the semiconductor laser 23 is found to have progressed, the third computing section 74 sends, to a spindle motor 19, an instruction to decrease the number of spins of the magnetic recording medium 3.

The following explains a method of determining the degree of deterioration of the semiconductor laser 23. When the semiconductor laser 23 that is a light source has deteriorated, the semiconductor laser 23 suddenly stops light emission in some cases. In other cases, a threshold current value of the semiconductor laser 23 gradually increases. In the case where the threshold current value gradually increases, under the same temperature condition, the driving current value of the semiconductor laser 23 increases though the light output necessary for recording information is constant. Accordingly, the degree of deterioration of the semiconductor laser 23 can be determined by comparing, under the same temperature condition and the same recording condition, a driving current value that is recorded in production of the magnetic recording/reproducing device 1 with a driving current value of the semiconductor laser 23 at the time of test writing. Here, the same recording condition is recording conditions under which the light output from the semiconductor laser 23 becomes the same. Under such a recording condition, a record mark length of recording on the magnetic recording medium 3, a radius position at the time of recording on the magnetic recording medium 3 or the number of spins of the magnetic recording medium 3 may be different.

Moreover, the degree of deterioration of the semiconductor 23 may be determined according to, for example, (i) a ratio of the driving current value at the determination of the degree of deterioration to the driving current value that is recorded at the time of production of the magnetic recording/reproducing device 1 or (ii) a difference of these driving current values. Generally, in a case where the deterioration of the semiconductor laser 23 has progressed, the driving current value increases at the time when light emission is performed at the same light output and at the same temperature. Accordingly, for example, an index value may be a value obtained by subtracting the driving current value in the production (the driving current value that is recorded in advance in the heat generation amount control information retaining section) from the driving current value at the determination of the degree of the deterioration, and is used as the degree of deterioration of the light source. In a case where a light emitting diode is used as the light source other than in a case where the semiconductor laser 23 is used as the light source, the driving current value for causing light emission at the same temperature and at the same light output increases when deterioration of the light emitting diode has progressed. Therefore, in the case of the light emitting diode, as in the case of the semiconductor laser 23, the driving current value may be used as a degree of deterioration of the light source.

Next, the following explains an operational flow at the heat generation amount control device 12 of the present embodiment, with reference to FIG. 14.

First, in the step S31, the first computing section 71 obtains temperature information on a temperature inside the magnetic recording/reproducing device 1 from the temperature sensor 13. Then, in the step S32, based on thus obtained temperature information, the first computing section 71 makes an inquiry to the heat generation amount control information retaining section 16. Then, in the step S33, the first computing section 71 determines a driving current value to the semiconductor laser 23 which driving current value corresponds to the temperature information. Further, in the step S34, the first computing section 71 sends, to the second computing section 72, the driving current value that is determined by the first computing section 71.

In the step S35, the second computing section 72 carries out test writing or test reading with the use of the driving current value that is determined by the first computing section 71. Then, in the step S36, the third computing section 74 obtains the driving current value that is determined by the first computing section 71, and the driving current value that is obtained by the second computing section 72 as the result of the test writing or the test reading. In the step 37, the third computing section 74 compares thus obtained driving current values. The method of the comparison may be a method of comparing (i) a value obtained by subtracting the driving current value that is obtained from the first computing section 71 from the driving current value that is obtained from the second computing section 72 with (ii) a predetermined value. Alternatively, the method of the comparison may be a method of comparing (i) a value of ratio of the driving current value that is obtained from the second computing section 72 and the driving current value that is obtained from the first computing section 71 with (ii) a predetermined value. Subsequently, in the step S38, in a case where a result of the comparison of the obtained driving current values by the third computing section 74 is larger than a predetermined value (YES in the step S38), the degree of deterioration of the semiconductor laser 23 is determined to have progressed and the third computing section 74 starts an operation in the step S39. Meanwhile, in a case where a result of the comparison of the obtained driving current values by the third computing section 74 is not larger than the predetermined value (NO in the step S38), the degree of deterioration of the semiconductor laser 23 is determined to not have progressed, and the third computing section 74 starts an operation in the step S40. The predetermined value here is, for example, a value that is obtained by subtracting a driving current value that is obtained from the first computing section 71 from a driving current value that is obtained from the second computing section 72, or a ratio of the driving current value that is obtained from the second computing section 72 and the driving current value that is obtained from the first computing section 71. Such a value or such a ratio is obtained when the degree of deterioration of the light source is such that a user can have a sufficient time to make a backup at the degree of deterioration.

In the step S39, the third computing section 74 gives an instruction to decrease the number of spins of the spindle motor 19 (that is, to decrease the number of spins of the magnetic recording medium 3). Then, in the step S40, after the number of spins becomes a predetermined number of spins, test writing or test reading is carried out. As a result of the test writing or the test reading, a driving current value appropriate for carrying out recording or reproduction with respect to the magnetic recording medium 3 is obtained. This driving current value is sent to the command section 17. In this case, because the deterioration of the light source has progressed and the number of spins is different from a predetermined number of spins, the relationship of the temperature and the driving current value at the time of the production is not present. Accordingly, as a driving current value to start the test writing or the test reading may be a sufficiently small value, for example, 0 mA.

In a case where the magnetic recording medium 3 is a heat-assisted recording/reproduction medium that requires heating both at the time of recording and at the time of reproduction, the flow from the step S31 to the step S40 may be repeated so that both test writing and test reading are carried out.

The present embodiment has an arrangement in which the third computing section 74 obtains, in the step S36, the driving current value that is determined by the first computing section 71 and the driving current value that is obtained by the second computing section 72 as a result of test writing or test reading. However, the third computing section 74 may obtain only the driving current value that is determined by the first computing section 71 in the steps from the step S33 to the step S35.

It is also possible to output, to an external device (for example, a personal computer 2), the temperature information on a temperature inside the magnetic recording/reproducing device 1 and the driving current value corresponding to the temperature which temperature and driving current value are obtained as a result of the test writing or the test reading, as the heat generation amount control information. For example, the degree of deterioration of the semiconductor laser 23 can be determined by comparing (i) the temperature information on a temperature inside the magnetic recording/reproducing device 1 and the driving current value corresponding to the temperature which temperature information and driving current value are recorded at the time of production of the magnetic recording/reproducing device 1 with (ii) the temperature information on a temperature inside the magnetic recording/reproducing device 1 and the driving current value corresponding to the temperature which temperature information and the driving current value are obtained by the test writing or the test reading.

In the arrangement of the present embodiment, the third computing section 74 carries out steps up to the determination of the degree of deterioration of the semiconductor laser 23. However, the present invention is not necessarily limited to this. For example, the third computing section 74 may output, to an external device that is connected to the magnetic recording/reproducing device 1, information on the driving current values that the third computing section 74 has obtained from the first computing section 71 and the second computing section 72, respectively, so that the degree of deterioration of the semiconductor laser 23 is determined by the external device.

Moreover, the determination of the degree of deterioration of the semiconductor laser 23 is utilized in a manner advantageous to a user as follows. For example, in a case where, as described above, an index value is not less than a predetermined value, that is, in a case where the deterioration of the semiconductor laser is determined to have progressed, the magnetic recording/reproducing device 1 may carry out an automatic control for decreasing the number of spins of the magnetic recording medium 3 (the number of spins of the spindle motor 19). Alternatively, the determination result of the degree of deterioration may be conveyed to a user so that the user may determine to decrease the number of spins of the magnetic recording medium 3 (the number of spins of the spindle motor 19). Due to the decrease in the number of spins of the magnetic recording medium 3, the light output necessary for recording the information may become small. Therefore, even in the case of the semiconductor laser 23 whose deterioration has progressed, possibly of carrying out recording or reproduction of the information increases. Therefore, this gives the user time for making a copy of the information that is recorded on the magnetic recording medium 3, on other magnetic recording medium different from the magnetic recording medium 3.

The present embodiment has an arrangement in which the number of spins of the magnetic recording medium 3 (the number of spins of the spindle motor 19) is decreased in a case where the degree of deterioration of the semiconductor laser 23 is determined to have progressed. However, the present invention is not necessarily limited to this arrangement. For example, in a case where the degree of deterioration of the semiconductor laser 23 is determined to have progressed, the magnetic recording/reproducing device 1 may be switched to a mode in which only reproduction is possible from a mode in which both recording and reproduction are possible, by giving an instruction to perform only reproduction to the recording/reproduction-signal-processing-section-control device 11 or the recording/reproduction signal processing section 15 of a controller (reproduction control means) 10. This allows only the reproduction of information to be performed, even when the semiconductor laser 23 has deteriorated. This is because, in the case of employing a heat-assisted recording system in which the magnetic recording medium 3 is heated only when the information is recorded, the semiconductor laser 23 is not necessary at the time of reproduction. That is, by switching from the recording/reproduction mode to a reproduction mode, it becomes possible to avoid a risk of wrong erasing of information due to malfunction of the semiconductor laser 23 whose degree of deterioration has progressed. Moreover, it becomes possible to give the user time to make a backup of the information, because reproduction of the information is possible.

The present embodiment explains an arrangement including three sections of the first computing section 71, the second computing section 72, and the third computing section 74. The first computing section 71, the second computing section 72, and the third computing section 74 are illustrated as three divided sections as functional blocks. However, the present invention is not necessarily limited to this arrangement. For example, the first computing section 71, the second computing section 72, and the third computing section 74 may be provided as independent members, respectively. Alternatively, two or three of the first computing section 71, the second computing section 72, and the third computing section 74 may be provided as one member.

Furthermore, it is preferable that the heat generation amount control device 12 of the present invention that controls a heat generation amount of the heat generating section 20 for a magnetic recording medium 3 in at least either a case where a recording area of the magnetic recording medium 3 is heated by the heat generating section 20 so that information is recorded on the magnetic recording medium 3 by use of the recording head 25 or a case where a reproduction area of the magnetic recording medium 3 is heated by the heat generating section 20 so that information is reproduced with the use of the reproducing head 22, the heat generation amount control device 12 includes: a first computing section 41 controlling the heat generation amount obtained by the heat generating section 20 according to heat generation amount control information that is arranged, based on a predetermined reference, in advance to correspond to temperature information that is obtained from a temperature sensor 13, the heat generation amount control information for controlling the heat generation amount obtained by the heat generating section 20, the heat generation amount control information being arranged to correspond to each temperature so that the heat generation amount becomes a predetermined heat generation amount at each temperature.

According to the present invention, the first computing section 41 controls the heat generation amount obtained by the heat generating section 20, according to the heat generation amount control information. This heat generation amount control information is arranged, based on a predetermined reference, to correspond to the temperature information that is obtained from the temperature sensor 13. Accordingly, in a case where the magnetic recording medium 3 is heated by the heat generating section 20 according to the heat generation amount control information, the predetermined reference is arranged to be a temperature at which the information recorded on the magnetic recording medium 3 is not erased. Then, the heat generation amount control information is arranged to correspond to such a temperature. Then, even in a case where variation occurs, due to temperature variation, in the heat generation amount control information for controlling the heat generating section 20 that heats a recording area or a reproduction area of the magnetic recording medium 3, the heat generation amount control information in accordance with the temperature variation can be set. Further, because an instruction on the heat generation amount of the heat generating section 20 is given according to the heat generation amount control information in accordance with the temperature variation, it becomes possible to prevent wrong erasing of information recorded. This wrong erasing occurs due to excessive increase in the temperature of the recording area or the reproduction area of the magnetic recording medium 3. In other words, it becomes possible to appropriately carry out at least one of recording and reproduction with respect to the magnetic recording medium 3. Moreover, because recording or reproduction can be appropriately carried out with respect to the magnetic recording medium 3 as described above, it becomes unnecessary to take time for examining, by performing the test writing or the test reading, the heat generation amount control information appropriate for carrying out recording or reproduction with respect to the magnetic recording medium 3.

Further, even in a case where the test writing or the test reading is carried out, the test writing or the test reading can be carried out based on the appropriate heat generation amount control information and the heat generation amount control information that is determined by the first computing section 41. As a result, the number of trying the test writing or the test reading can be reduced. Therefore, it becomes possible to shorten a time taken for determining the heat generation amount control information of the heat generating section 20.

This easily makes it possible to appropriately carry out, in accordance with the temperature variation, at least either recording or reproduction with respect to the magnetic recording medium 3.

The predetermined reference is not limited to a reference according to which the heat generation amount control information is arranged to correspond to each temperature so that information that is recorded on the magnetic recording medium 3 is not erased from the magnetic recording medium 3 that is heated by the heat generating section 20 according to the heat generation amount control information. For example, in a case where the magnetic recording medium 3 is heated by the heat generating section 20 according to the heat generation amount control information, the heat generation means control information may be arranged to correspond to each temperature so that the generation means control information becomes a heating condition appropriate to the magnetic recording medium 3. A specific example of the "appropriate heating condition" here is a heating condition in which a jitter value, an error rate, or a signal amplitude value becomes a desired value. The desired value here is the reference value above. As a result, information that is recorded on the magnetic recording medium 3 can be prevented from being mistakenly erased at the time of recording or reproduction, by carrying out the recording or the reproduction with respect to the magnetic recording medium 3 under the "appropriate heating condition".

In the heat generation amount control device 12 of the present invention, the predetermined reference may arrange the heat generation amount control information to correspond to each temperature, so that information that is recorded on the magnetic recording medium 3 is not erased at the time when the magnetic recording medium 3 is heated by the heating section 20 according to the heat generation amount control information.

This allows the heat generation amount control information to correspond to each temperature, so that the information that is recorded on the magnetic recording medium 3 is not erased in a case where the magnetic recording medium 3 is heated by the heat generating section 20 according to the heat generation amount control information. This makes it possible to set heat generation amount control information in accordance with temperature variation, even when the heat generation amount control information for controlling the heat generating section 20 that heats the recording area or the reproduction area of the magnetic recording medium 3 varies due to temperature variation. As a result, when at least either recording or reproduction is carried out with respect to the magnetic recording medium 3 in accordance with temperature variation, the information that is recorded on the magnetic recording medium 3 is not erased.

The blocks of the heat generation amount control device 12, in particular, the first computing section 41, 51, 61, and 71, the second computing section 52, 62, and 72, the correcting section 63, the third computing section 74, and the command section 17 may be constituted by hardware logic or may be realized by software by using a CPU in the following manner.

That is, the heat generation amount control device 12 includes a CPU (central processing unit) that executes the order of a control program for realizing the aforesaid functions, ROM (read only memory) that stores the control program, RAM (random access memory) that develops the control program in executable form, and a storage device (storage medium), such as a memory, that stores the control program and various types of data therein. With this arrangement, the object of the present invention is realized by a predetermined storage medium. The storage medium stores, in a computer-readable manner, program codes (executable code program, intermediate code program, and source program) of the control program of the heat generation amount control device 12, which is software for realizing the aforesaid functions. The storage medium is provided to the heat generation amount control device 12. With this arrangement, the heat generation amount control device 12 (alternatively, CPU or MPU) as a computer reads out and executes the program code stored in the storage medium provided.

The storage medium may be tape based, such as a magnetic tape or cassette tape; disc based, such as a magnetic disk including a Floppy® disc and hard disk and optical disk including CD-ROM, MO, MD, DVD, and CD-R; card based, such as an IC card (including a memory card) and an optical card; or a semiconductor memory, such as a mask ROM, EPROM, EEPROM, and a flash ROM.

Further, the data generating device of the present invention may be arranged so as to be connectable to a communications network so that the program code is supplied to the data generating device through the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

According to the present invention, first computing means controls a heat generation amount of heat generation means, according to heat generation amount control information that is arranged, in advance, to correspond to temperature information that is obtained from temperature detection means. This makes it possible to set the heat generation amount control information in accordance with temperature variation. Because the heat generation amount of the heat generation means is instructed according to the heat generation amount control information in accordance with temperature variation, it becomes possible to prevent wrong erasing of information that is recorded on a magnetic recording medium which erasing is caused by an excessive increase in a temperature of a recording area or a reproduction area of the magnetic recording medium.

Because the recording or the reproduction can be appropriately carried out with respect to the magnetic recording medium as described above, it becomes unnecessary to take time for examining, by performing test writing or test reading, the heat generation amount control information appropriate for recording or reproduction carried out with respect to the magnetic recording medium, or the number of times for trying the test writing or the test reading can be reduced.

This provides an effect such that at least either appropriate recording or appropriate reproduction can be easily carried out with respect to the magnetic recording medium, in accordance with temperature variation.

A heat generation amount control device of the present invention that controls a heat generation amount of heat generation means for a magnetic recording medium, in at least either (i) a case where a recording area of the magnetic recording medium is heated by the heat generation means so that information is recorded on the magnetic recording medium by use of a recording head or (ii) a case where a reproduction area of the magnetic recording medium is heated by the heat generation means so that information is reproduced by use of a reproducing head, the heat generation amount control device includes: first computing means controlling the heat generation amount of the heat generation means according to heat generation amount control information that is arranged in advance to correspond to information on a temperature that is obtained from temperature detection means, the heat generation amount control information for controlling the heat generation amount of the heat generation means, the heat generation amount control information being arranged to correspond to each temperature so that the heat generation amount becomes a predetermined heat generation amount at the each temperature.

In the heat generation amount control device of the present invention, it is preferable that the heat generation amount control information is a driving current value of a light source included in the heat generation means.

According to the arrangement, a driving current value of the light source is stored in the heat generation amount control information retention means as heat generation amount control information at the time when a magnetic disk device employing the heat generation amount control device of the present invention is produced. This makes it possible to set, by reading out the heat generation amount control information, the driving current value of the light source provided in the heat generation means, when a user uses the magnetic disk device.

In the heat generation amount control device of the present invention, it is preferable that the heat generation means produces evanescent light at the recording head or the reproducing head by irradiating light from the light source on the recording head or the reproducing head, and heats the recording area or the reproduction area by irradiating the evanescent light on the magnetic recording medium.

Note that the evanescent light can realize a light spot that is smaller than a light spot whose radius is reduced to a minimum size that can be realized by normal light.

According to the above arrangement, because the evanescent light is irradiated on the magnetic recording medium from the recording head or the reproducing head, a smaller light spot can be formed on the magnetic recording medium. Therefore, it becomes possible to carry out recording/reproduction of information in a higher density with respect to the magnetic recording medium.

It is preferable that the heat generation amount control device of the present invention further includes: command means that gives the heat generation means an instruction on heating, according to the heat generation amount control information.

In the case of employing a light source like a semiconductor laser, light output varies depending on a temperature even when the same driving current is supplied. Even in such a case, according to the arrangement above, the driving current of the semiconductor laser can be controlled, based on the temperature information that is obtained by the temperature detection means. Therefore, it becomes possible to precisely control the heat generation means regardless of the temperature.

It is preferable that the heat generation amount control device of the present invention further includes: heat generation amount control information retention means that stores information on a plurality of temperatures and heat generation amount control information arranged in advance to correspond to information on each of the plurality of temperatures, the heat generation amount control information retention means being the magnetic recording medium.

According to the arrangement, it becomes unnecessary to include an additional arrangement other than the magnetic recording medium (e.g., a semiconductor memory) in the magnetic disk device employing the heat generation amount control device of the present invention. As a result, cost reduction of the magnetic disk device becomes possible.

It is preferable that the heat generation amount control device of the present invention further includes: heat generation amount control information retention means that stores information on a plurality of temperatures and heat generation amount control information arranged in advance to correspond to information on each of the plurality of temperatures, the heat generation amount control information retention means being provided separately from the magnetic recording medium.

This arrangement makes it possible to prevent a case where information recorded is wrongly erased due to heat generated by the heat generation means, when the heat generation amount control information is read out from the heat generation amount control information retention means. This is because the semiconductor memory does not require, at the time when information is reproduced, heat generated by the heat generation means.

It is preferable that the heat generation amount control device of the present invention further includes: second computing means that carries out at least either test writing for determining heat generation amount control information that is optimum for recording information on the magnetic recording medium or test reading for determining heat generation amount control information that is optimum for reproducing information from the magnetic recording medium.

According to the arrangement, the second computing means carries out test writing or test reading. Therefore, even when temperature variation of the magnetic recording/reproducing device occurs, it becomes possible at least either to determine heat generation amount control information that is optimum for recording information on the magnetic recording medium or to determine heat generation amount control information that is optimum for reproducing information from the magnetic recording medium. As a result, it becomes possible to set more appropriate heat generation amount control information of the heat generation means.

In the heat generation amount control device of the present invention, it is preferable that the second computing means stores, in the heat generation amount control information retention means, the heat generation amount control information that is obtained by at least either the test writing or the test reading.

According to the arrangement, when next test writing or next test reading is to be performed after once test writing or test reading is performed, conditions to start the next test writing or the next test reading can be set with reference to the heat generation amount control information. Therefore, it becomes possible to shorten a time necessary for the test reading or the test writing.

In the heat generation amount control device of the present invention, it is preferable that the second computing means stores, in the heat generation amount control information retention means, the information on the temperature that is obtained from the temperature detection means at the point when the heat generation amount control information is obtained, as well as the heat generation amount control information that is obtained from at least either the test writing or the test reading.

According to the arrangement, when next test writing or next test reading is to be performed after once test writing or test reading is performed, conditions to start the next test writing or the next test reading can be set in accordance with a temperature at the next test writing or the next test reading with reference to the temperature and the heat generation amount control information. Therefore, it becomes possible to shorten a time for carrying out test reading or test writing that is appropriate for a temperature at the test writing or the test reading.

In the heat generation amount control device of the present invention, it is preferable that the second computing means keeps the information on the temperature that is obtained from the temperature detection means when at least either the test writing or the test reading is carried out, and carries out at least either the test writing or the test reading again in a case where a value of a difference obtained by subtracting a temperature obtained from the temperature detection means from the temperature kept by the second computing means becomes not less than a predetermined value.

The predetermined value indicates a value obtained by subtracting the temperature that is obtained from the temperature detection means from the temperature kept by the second computing means, which value is obtained at the time when possibility of the occurrence of a burst error that is a set of sequential errors arises due to temperature variation from the temperature that is kept by the second computing means to the temperature that is obtained by the temperature detection means.

According to this arrangement, test writing or test reading is carried out according to temperature variation. Therefore, even in a case where the magnetic disk device utilizing the heat generation amount control device of the present invention is operated for long hours, recording or reproduction is carried out with respect to the magnetic recording medium, based on the heat generation amount control information in accordance with the temperature variation. Therefore, it becomes possible to carry out more stable recording or reproduction with respect to the magnetic recording medium.

In the heat generation amount control device of the present invention, it is preferable that: the second computing means carries out the test writing by: recording information on the magnetic recording medium by use of the recording head while varying a driving current of the light source, and then determining a driving current value as the heat generation amount control information that is optimum for recording information on the magnetic recording medium by use of the recording head while varying the driving current of the light source in accordance with a reproduction signal that is obtained by reproducing the information by use of the recording head.

According to this arrangement, it becomes possible to set a driving current as heat generation amount control information appropriate for carrying out recording or reproduction with respect to the magnetic recording medium.

In the heat generation amount control device of the present invention, it is preferable that at the time of reproducing, by use of the reproducing head, a signal that is recorded in advance on the magnetic recording medium, the second computing means carries out the test reading by determining, based on a reproduction signal of the information reproduced by use of the reproducing head, a driving current value that is the heat generation amount control information that is optimum for reproducing information from the magnetic recording medium by use of the reproducing head.

According to this arrangement, it becomes possible to set a driving current as heat generation amount control information appropriate for carrying out recording or reproduction with respect to the magnetic recording medium.

It is preferable that the heat generation amount control device of the present invention further includes: correction means that carries out correction, according to the information on the temperature that is obtained from the temperature detection means, with respect to the driving current value as the heat generation amount control information determined by the first computing means, so that the driving current value decreases by a predetermined value, the driving current value that is corrected by the correction means being arranged to be a driving current value at the time of starting at least either the test writing or the test reading.

The predetermined value is a value that is preset based on a range of a measurement error of a temperature sensor or a range of a temperature increase that may occur within a short period of time. The predetermined value is at a level at which a corrected driving current value does not become lower than the driving current value necessary at the time of carrying out recording or reproduction with respect to the magnetic recording medium, in a case where the driving current value corresponding to the temperature information is corrected by the predetermined value.

This prevents the magnetic recording medium from being excessively heated, even in a case where a measurement error of the temperature sensor or a temperature increase within a short period of time occurs. Accordingly, damage to the magnetic recording medium or wrong erasing of a recorded signal can be prevented. Further, regarding test writing or test reading, test writing or test reading always needs to be started from a sufficiently low driving current value for preventing the wrong erasing of a record due to excessive heating of the magnetic recording medium. However, in the above arrangement, test writing or test reading is started from a driving current value that is lowered by a minimum necessary level. Therefore, it becomes possible to shorten the time necessary for determining the driving current value appropriate for carrying out the recording or the reproduction with respect to the magnetic recording medium.

It is preferable that the heat generation amount control device of the present invention further includes: third computing means that determines a degree of deterioration which degree is indicative of a level of decrease in light output of the light source, by comparing, based on the information on the temperature that is obtained from the temperature detection means, (i) the driving current value determined by the first computing means with (ii) the driving current value obtained by at least either the test writing or the test reading by the second computing means.

According to the arrangement, the third computing means compares (i) the driving current value that is arranged in advance to correspond to the information on the temperature obtained from the temperature detection means and that is determined by the first computing means with (ii) the driving current value that is obtained by at least either the test writing or the test reading at the temperature and that is actually determined by the second computing means. Therefore, the variation in the driving current value can be used as variation in the degree of deterioration of the light source. As a result, the degree of deterioration of the light source can be more precisely determined.

Further, in the heat generation amount control device of the present invention, it is preferable that the third computing means gives an instruction to decrease a number of spins to spin means that spins the magnetic recording medium for recording or reproduction, in a case where, as a result of determining the degree of deterioration, the degree of deterioration becomes larger than a predetermined value.

The predetermined value is a value that is obtained when the degree of deterioration of the light source is such that a user can have a sufficient time to make a backup at the degree of deterioration.

According to this arrangement, in a case where the third computing means determines that the degree of deterioration is larger than a predetermined value, the number of times of spins of the spin means is reduced. Due to the decreased number of spins of the spin means, the number of spins of the magnetic recording medium is decreased. As a result, a time in which light is outputted on an area to be heated by the light source is lengthened. This makes it possible to carry out recording or reproduction with respect to the magnetic recording medium, even when light output of the light source decreases. Therefore, before the light source completely breaks down, minimum necessary recording or reproduction can be carried out.

In the heat generation amount control device of the present invention, it is preferable that the third computing means gives an instruction to reproduction control means that controls reproduction of information by use of the reproducing head, so as to cause only the reproduction out of the recording and the reproduction with respect to the magnetic recording medium is carried out with respect to the magnetic recording medium, in a case where, as a result of determining the degree of deterioration, the degree of deterioration becomes larger than the predetermined value.

The predetermined value is a value that is obtained when the degree of deterioration of the light source is such that a user can have a sufficient time to make a backup at the degree of deterioration.

This makes it possible to carry out only reproduction in a case where the third computing means determines that the degree of deterioration becomes larger than a predetermined value. Therefore, in a case where the light of the light source is utilized only at the time of recording, reproduction of information that has been recorded is possible even if the light source deteriorates or breaks down. Moreover, even in a case where the light source is used at the time of recording and reproduction, limitation of functions to only reproduction increases possibility of allowing a user to make a backup of information that has been recorded.

The heat generation amount control device of the present invention may be realized by hardware or by causing a computer to execute a program. More specifically, the program of the present invention is a program causing a computer to operate as the heat generation amount control device. The recording medium of the present invention stores this program.

When a computer executes these programs, the computer operates as the heat generation amount control device. Accordingly, like the heat generation amount control device, the computer easily makes it possible to appropriately carry out at least either recording or reproduction with respect to the magnetic recording medium in accordance with temperature variation.

A magnetic disk device of the present invention in which (i) information is recorded on a magnetic recording medium by use of a recording head after a recording area of the magnetic recording medium is heated by use of heat generation means or (ii) information is reproduced by use of a reproducing head after a reproduction area of the magnetic recording medium is heated by use of the heat generation means, the magnetic disk device includes: temperature detection means; heat generation amount control information retention means storing information on a plurality of temperatures and heat generation amount control information arranged in advance to correspond to information on each of the plurality of temperatures; and a heat generation amount control device that makes an inquiry to the heat generation amount control information retention means based on information on a temperature that is obtained from the temperature detection means, and controls a heat generation amount of the heat generation means according to the heat generation amount control information, the heat generation amount control device being any one of the heat generation amount control devices described above.

According to the invention, the first computing means controls the heat generation amount of the heat generation means according to the heat generation amount control information that is arranged in advance to correspond to information on a temperature that is obtained from the temperature detection means. Therefore, if the predetermined heat generation amount is a heat generation amount with which the magnetic recording medium is appropriately heated, it becomes possible to set the heat generation amount control information in accordance with the temperature variation even in a case where the heat generation amount control information varies which heat generation amount control information is for controlling the heat generation means heating the recording area or the reproduction area of the heat recording medium in accordance with the temperature variation. Because an instruction on the heat generation amount that is obtained by the heat generation means is given according to the heat generation amount control information in accordance with the temperature variation, it becomes possible to prevent wrong erasing of the information that has been recorded which wrong erasing occurs due to excessive temperature increase in the recording area or the reproduction area of the magnetic recording medium. In other words, it becomes possible to appropriately carry out at least either recording or reproduction with respect to the magnetic recording medium. Furthermore, because recording or reproduction can be appropriately carried out with respect to the magnetic recording medium as described above, it becomes unnecessary to take time for examining, by performing test writing or test reading, heat generation amount control information appropriate for carrying out recording or reproduction with respect to the magnetic recording medium.

Further, even in a case where the test writing or the test reading is performed, the test writing or the test reading can be performed based on the appropriate heat generation amount control information and the heat generation amount control information that is determined by the first computing means. Accordingly, the number of trying the test writing or the test reading can be reduced. As a result, it becomes possible to shorten a time for determining the heat generation amount control information of the heat generation means.

This easily makes it possible to appropriately carry out at least either recording or reproduction with respect to the magnetic recording medium, in accordance with the temperature variation.

A magnetic disk device of the present invention in which (i) information is recorded on a magnetic recording medium by use of a recording head after a recording area of the magnetic recording medium is heated by use of heat generation means or (ii) information is reproduced by a reproducing head after a reproduction area of the magnetic recording medium is heated by use of the heat generation means, the magnetic disk device includes: the heat generation means that heats at least either the recording area or the reproduction area of the magnetic recording medium; heat generation amount control information retention means storing information on a plurality of temperatures and heat generation amount control information arranged in advance to correspond to information on each of the plurality of temperatures; and a heat generation amount control device that makes an inquiry to the heat generation amount control information retention means based on information on a temperature that is obtained from temperature detection means, and controls a heat generation amount of the heat generation means according to the heat generation amount control information, the heat generation amount control device being any one of the heat generation amount control devices described above, and being connected to an external device including the temperature detection means in a manner that allows exchange of information between the heat generation amount control device and the external device.

The invention easily makes it possible to appropriately carry out at least either recording or reproduction with respect to the magnetic recording medium, in accordance with temperature variation. Moreover, it becomes unnecessary to include temperature detection means in the magnetic disk device. Therefore, cost reduction and size reduction of the magnetic disk device become possible.

A magnetic disk device of the present invention in which (i) information is recorded on a magnetic recording medium by use of a recording head after a recording area of the magnetic recording medium is heated by use of heat generation means or (ii) information is reproduced by a reproducing head after a reproduction area of the magnetic recording medium is heated by use of the heat generation means, the magnetic disk device includes: the heat generation means that heats at least either the recording area or the reproduction area of the magnetic recording medium; temperature detection means; heat generation amount control information retention means storing information on a plurality of temperatures and heat generation amount control information arranged in advance to correspond to information on each of the plurality of temperatures; and a heat generation amount control device that makes an inquiry to the heat generation amount control information retention means based on information on a temperature that is obtained from the temperature detection means, and controls a heat generation amount of the heat generation means according to the heat generation amount control information, the heat generation amount control device being any one of the heat generation amount control devices described above, and outputting, to an external device, heat generation amount control information that is obtained by test writing or test reading by second computing means and the information on the temperature that is obtained by the temperature detection means.

The present invention makes it possible to appropriately carry out at least either recording or reproduction with respect to the magnetic recording medium, in accordance with temperature variation. Moreover, it becomes possible to monitor, by use of an external device, the heat generation amount control information obtained by the test writing or the test reading and a temperature at the time of the test writing or the test reading which temperature is obtained by the temperature detection means. As a result, a user can acknowledge or judge a degree of deterioration of the heat generation means.

It is preferable that the magnetic disk device of the present invention further outputs, to the external device, the information on the plurality of temperatures and the heat generation amount control information arranged in advance to correspond to each of the plurality of temperatures, the information on the plurality of temperatures and the heat generation amount control information being stored in the heat generation amount control information retention means.

According to the arrangement, in addition to the heat generation amount control information obtained by the test writing or the test reading, it becomes possible to obtain the heat generation amount control information at the time when the magnetic disk device is produced. Accordingly, it becomes possible to compare the heat generation amount control information corresponding to the present time with the heat generation amount control information corresponding to a temperature stored at the time when the magnetic disk device is produced. As a result, it becomes possible to judge the degree of deterioration of the light source more precisely.

A heat generation amount control method of the present invention for controlling a heat generation amount of heat generation means for a magnetic recording medium in at least either one of (i) the step of recording information on the magnetic recording medium by use of a recording head after a recording area of the magnetic recording medium is heated by use of the heat generation means and (ii) the step of reproducing information by use of a reproducing head after a reproduction area of the magnetic recording medium is heated by use of the heat generation means, the heat generation amount control method includes steps of: detecting information on a temperature by temperature detection means; and performing first computing, by first computing means, for controlling the heat generation amount of the heat generation means according to the heat generation amount control information that is arranged in advance to correspond to the information on the temperature obtained from the temperature detection means.

It is preferable that the heat generation amount control method of the present invention further includes at least either one of the steps of: performing, by the second computing means, test writing for determining heat generation amount control information that is optimum for recording information on the magnetic recording medium; and performing, by the second computing means, test reading for determining heat generation amount control information that is optimum for reproducing information from the magnetic recording medium.

According to this arrangement, the second computing means carries out test writing or test reading. Accordingly, even when a temperature of the magnetic disk device varies, it becomes possible at least either to determine heat generation amount control information that is optimum for recording information on the magnetic recording medium or to determine heat generation amount control information that is optimum for reproducing information from the magnetic recording medium. As a result, more appropriate heat generation amount control information of the heat generation means can be set.

The present invention is not limited to the description of the embodiments above, but may be altered by a skilled person within the scope of the claims. An embodiment based on a proper combination of technical means disclosed in different embodiments is encompassed in the technical scope of the present invention.

[Industrial Applicability]

The heat generation amount control device, the program and the recording medium therefor, the magnetic disk device, and the heat generation amount control method according to the present invention easily makes it possible to appropriately carry out, in accordance with temperature variation, at least either recording or reproduction with respect to the magnetic recording medium. Therefore, the present invention can be suitably applied to a magnetic disk device that carries out recording or reproduction with the use of a heat-assisted recording medium, or an industrial field that is related to the magnetic disk device.

The invention claimed is:

1. A heat generation amount control device that controls a heat generation amount of a heat generation means for heating a magnetic recording medium, in at least either (i) a case where a recording area of the magnetic recording medium is heated by the heat generation means so that information is recorded on the magnetic recording medium by use of a recording head or (ii) a case where a reproduction area of the magnetic recording medium is heated by the heat generation means so that information is reproduced by use of a reproducing head, the heat generation amount control device comprising:

a first computing means for controlling a heat generation amount of the heat generation means from a first instance of heating a recording medium by the heat generation means under the control of the heat generation amount control device, according to heat generation amount control information that is obtained in advance during the production of the heat generation amount control device so as to correspond to information on temperatures that is obtained from a temperature detection means the heat generation amount control information being so arranged as to correspond to each of said temperatures such that the heat generation amount becomes a predetermined heat generation amount at each of said temperatures, and the heat generation amount control information being a driving current value of a light source included in the heat generation means.

2. The heat generation amount control device as set forth in claim 1, wherein:

the heat generation means produces evanescent light at a recording head or a reproducing head by irradiating light from the light source on the recording head or the reproducing head, and heats the recording area or the reproduction area by irradiating the evanescent light onto the recording area or the reproducing area of the magnetic recording medium.

3. The heat generation amount control device as set forth in claim 1, further comprising command means for providing an instruction on heating to the heat generation means according to the heat generation amount control information.

4. The heat generation amount control device as set forth in claim 1, further comprising:

a retention means included in said magnetic recording means, said retention means storing information on a plurality of temperatures and heat generation amount control information corresponding to each of said plurality of temperatures; and a retrieval means for selectively retrieving said heat generation amount control information from said retention means.

5. The heat generation amount control device as set forth in claim 1, further comprising:

a retention means provided separately from said magnetic recording means, said retention means storing information on a plurality of temperatures and heat generation amount control information corresponding to each of said plurality of temperatures; and a retrieval means for selectively retrieving said heat generation amount control information from said retention means.

6. The heat generation amount control device as set forth in claim 1, further comprising:

a second computing means that at each temperature detected by the temperature detecting means carries out at least either test writing for determining heat generation amount control information that is optimum for recording information on the magnetic recording medium, or test reading for determining heat generation amount control information that is optimum for reproducing information from the magnetic recording medium.

7. The heat generation amount control device as set forth in claim 6, wherein:

the second computing means stores, in a retention means, the heat generation amount control information that is obtained by at least either the test writing or the test reading.

8. The heat generation amount control device as set forth in claim 6, wherein:
the retention means stores information on each detected temperature that is obtained by the temperature information obtaining means and the associated heat generation amount control information, as well as the heat generation amount control information that is obtained from the corresponding at least either the test writing or the test reading.

9. The heat generation amount control device as set forth in, claim 6 wherein:
the retention means stores the information on the temperature, that is obtained from the temperature information obtaining means when at least either the test writing or the test reading is carried out, and carries out at least either a test writing or a test reading again in a case where a value of a difference obtained by subtracting a temperature obtained from the temperature information obtaining means from a corresponding temperature stored by the retaining means becomes not less than a predetermined value.

10. The heat generation amount control device as set forth in, claim 6 wherein:
the second computing means carries out the test writing by:
recording test information on the magnetic recording medium using a recording head while varying a driving current of the light source, and then determining a particular driving current value of the light source as being the heat generation amount control information that is optimum for recording information on the magnetic recording medium using the recording head according to the optimum reproduction signal that is obtained by reproducing the test information using a reproducing head.

11. The heat generation amount control device as set forth in claim 6, wherein:
the second computing means carries out test reading while varying a driving current of the light source, and determines based on the optimum reproduction of the test information using the reproducing head, the driving current value that corresponds to the heat generation amount control information that is optimum for reproducing the test information from the magnetic recording medium by use of the reproducing head.

12. The heat generation amount control device as set forth in claim 10, further comprising:
a correction means for carrying out a correction, according to the information on temperature that is obtained from the temperature information obtaining means, with respect to the driving current value corresponding to the heat generation amount control information determined by the first computing means, so that the driving current value decreases by a predetermined value, wherein
the driving current value that is corrected by the correction means is arranged to be a driving current value at the time of starting at least either the test writing or the test reading.

13. The heat generation amount control device as set forth in claim 10, further comprising:
a third computing means for determining a degree of deterioration which degree of deterioration is indicative of a level of a decrease in light output of the light source, by comparing, based on the information on a temperature that is obtained from the temperature information obtaining means, (i) the driving current value determined by the first computing means with (ii) the driving current value obtained by at least either the test writing or the test reading by the second computing means.

14. The heat generation amount control device as set forth claim 13, wherein:
the third computing means provides an instruction to decrease a number of spins to a spin means that spins the magnetic recording medium for recording or reproduction, in a case where, as a result of the determining of a degree of deterioration, the degree of deterioration becomes larger than a predetermined value.

15. The heat generation amount control device as set forth claim 13, wherein:
the third computing means provides an instruction to a reproduction control means for controlling reproduction of information using the reproducing head, said instruction causing only the reproduction to be carried out with respect to the magnetic recording medium, in a case where, as a result of determining the degree of deterioration, the degree of deterioration becomes larger than the predetermined value.

16. A non-transitory computer-readable recording medium having recorded thereon a program for causing a computer to operate a heat generation amount control device that controls a heat generation amount control device that controls a heat generation amount of a heat generation means for heating a magnetic recording medium, in at least either (i) a case where a recording area of the magnetic recording medium is heated by the heat generation means so that information is recorded on the magnetic recording medium by use of a recording head or (ii) a case where a reproduction area of the magnetic recording medium is heated by the heat generation means so that information is reproduced by use of a reproducing head, the heat generation amount control device comprising:
a first computing means for controlling a heat generation amount of the heat generation means from a first instance of heating a recording medium by the heat generation means under the control of the heat generation amount control device, according to heat generation amount control information that is obtained in advance during the production of the heat generation amount control device so as to correspond to information on temperatures that is obtained from a temperature detection means
the heat generation amount control information being so arranged as to correspond to each of said temperatures such that the heat generation amount becomes a predetermined heat generation amount at each of said temperatures, and
the heat generation amount control information being a driving current value of a light source included in the heat generation means.

17. A magnetic disk device in which (i) information is recorded on a magnetic recording medium using a recording head after a recording area of the magnetic recording medium is heated using a heat generation means or (ii) information is reproduced using a reproducing head after a reproduction area of the magnetic recording medium is heated using the heat generation means, the magnetic disk device comprising:
a temperature detection means;
a heat generation amount control information retention means for storing (i) information on a plurality of temperatures and (ii) heat generation amount control information arranged in advance to correspond to information on each of the plurality of temperatures; and
a heat generation amount control device that makes an inquiry to the heat generation amount control information retention means based on information on a temperature that is obtained from the temperature detection means, and controls a heat generation amount of the heat generation means according to the heat generation amount control information, the heat generation amount control device being a heat generation amount control device as set forth in claim 1.

18. A magnetic disk device in which (i) information is recorded on a magnetic recording medium by use of a recording head after a recording area of the magnetic recording medium is heated by use of a heat generation means or (ii) information is reproduced by a reproducing head after a reproduction area of the magnetic recording medium is heated by use of the heat generation means, the magnetic disk device comprising:

the het generation means that heats at least either the recording area or the reproduction area of the magnetic recording medium;

a heat generation amount control information retention means for storing information on a plurality of temperatures and heat generation amount control information arranged in advance to correspond to information on each of the plurality of temperatures; and a heat generation amount control device that makes an inquiry to the heat generation amount control information retention means based on information on a temperature that is obtained from a temperature detection means, and controls a heat generation amount of the heat generation means according to the heat generation amount control information, the heat generation amount control device being a heat generation amount control device as set forth in claim 1, and being connected to an external device including the temperature detection means in a manner that allows an exchange of information between the heat generation amount control device and the external device.

19. A magnetic disk device in which (i) information is recorded on a magnetic recording medium by use of a recording head after a recording area of the magnetic recording medium is heated by use of a heat generation means or (ii) information is reproduced by a reproducing head after a reproduction area of the magnetic recording medium is heated by use of the heat generation means, the magnetic disk device comprising:

the heat generation means that heats at least either the recording area or the reproduction area of the magnetic recording medium;

a temperature detection means;

a heat generation amount control information retention means for storing (i) information on a plurality of temperatures and (ii) heat generation amount control information arranged in advance to correspond to information on each of the plurality of temperatures; and a heat generation amount control device that makes an inquiry to the heat generation amount control information retention means based on information on a temperature that is obtained from the temperature detection means, and controls a heat generation amount of the heat generation means according to the heat generation amount control information, the heat generation amount control device being a heat generation amount control device as set forth in claim 6, that outputs, to an external device, (a) heat generation amount control information that is obtained by a test writing or a test reading by a second computing means and (b) the information on a temperature that is obtained by the temperature detection means.

20. The magnetic disk device as set forth in claim 19, wherein said magnetic disk further outputs, to the external device, the information on a plurality of temperatures and the heat generation amount control information arranged in advance to correspond to each of the plurality of temperatures, the information on the plurality of temperatures and the heat generation amount control information being stored in the heat generation amount control information retention means.

21. A heat generation amount control method for controlling a heat generation amount of a heat generation means for heating a magnetic recording medium in at least either one of (i) a step of recording information on the magnetic recording medium using a recording head after a recording area of the magnetic recording medium is heated by use of the heat generation means and (ii) a step of reproducing information using a reproducing head after a reproduction area of the magnetic recording medium is heated by use of the heat generation means, the heat generation amount control method comprising the steps of:

detecting an information on a temperature using a temperature detection means;

storing in a retention means heat generation amount control information arranged at the time of the production of the heat generation amount control device so as to correspond to the detected information on temperatures such that the heat generation amount becomes a predetermined heat generation amount determined by a driving current value of a light source, and performing a first computing using a first computing means for controlling a heat generation amount of the heat generation means according to a heat generation amount control information, the heat generation amount control information being a driving current value of a light source included in the heat generation means.

22. The heat generation amount control method as set forth claim 21, further comprising at least one of the steps of:

performing, by a second computing means, a test writing for determining a heat generation amount control information that is optimum for recording information on the magnetic recording medium; and performing, by the second computing means, a test reading for determining a heat generation amount control information that is optimum for reproducing information from the magnetic recording medium.

* * * * *